US011533919B2

(12) United States Patent
Esarey

(10) Patent No.: US 11,533,919 B2
(45) Date of Patent: Dec. 27, 2022

(54) FEED ROLL FOR POWER OPERATED TRIMMING TOOL

(71) Applicant: Bettcher Industries, Inc., Birmingham, OH (US)

(72) Inventor: Bernard J. Esarey, Lorain, OH (US)

(73) Assignee: Bettcher Industries, Inc., Birmingham, OH (US)

( * ) Notice: Subject to any disclaimer, the term of this patent is extended or adjusted under 35 U.S.C. 154(b) by 0 days.

(21) Appl. No.: 17/378,048

(22) Filed: Jul. 16, 2021

(65) Prior Publication Data

US 2022/0022471 A1  Jan. 27, 2022

Related U.S. Application Data

(60) Provisional application No. 63/054,753, filed on Jul. 21, 2020.

(51) Int. Cl.
*A22B 5/16* (2006.01)

(52) U.S. Cl.
CPC .............. *A22B 5/168* (2013.01); *A22B 5/166* (2013.01)

(58) Field of Classification Search
CPC .......... A22B 5/166; A22B 5/168; A22C 17/12
USPC .................................. 452/132, 133
See application file for complete search history.

(56) References Cited

U.S. PATENT DOCUMENTS

| 1,379,153 A | 5/1921 | Young |
| 2,540,462 A | 2/1951 | Smith |
| 2,730,100 A | 1/1956 | Hood |
| 3,174,599 A | 3/1965 | Spyridakis et al. |
| 3,197,808 A | 8/1965 | Mears |
| 3,670,734 A | 6/1972 | Hardy, Jr. |
| 4,071,923 A | 2/1978 | Smith |

(Continued)

FOREIGN PATENT DOCUMENTS

| CA | 1242854 | 10/1988 |
| GB | 1515047 | 6/1978 |

OTHER PUBLICATIONS

Operations Manual for Integra™ Model C Air Dermatome, Manufactured by Integra LifeSciences Corporation, Cincinnati, OH, Copyright 2009 (82 pages) (Exhibit A).

(Continued)

*Primary Examiner* — Richard T Price, Jr.
(74) *Attorney, Agent, or Firm* — Tarolli, Sundheim, Covell & Tummino LLP

(57) ABSTRACT

A power-driven feed roll for rotation about a feed roll axis of rotation in a hand-held, power operated trimming tool, the feed roll including a cylindrical core having an inner surface defining a through bore and an outer surface including a central cylindrical recess bounded by a base and first and second radially extending side walls at opposite ends of the base and first and second flanking portions on either side of the cylindrical recess. The feed roll further includes an annular drive member formed over the cylindrical recess and integral with the cylindrical core, the annular drive member extending along the first and second radially extending side walls of cylindrical recess and protruding radially outwardly, an outer surface of the annular drive member defining a worm gear for driving the feed roll about the axis of rotation. The first and second flanking portions including annular sets of drive teeth.

20 Claims, 21 Drawing Sheets

(56) References Cited

U.S. PATENT DOCUMENTS

| | | | |
|---|---|---|---|
| 4,186,461 | A | 2/1980 | Leining |
| 4,451,953 | A | 6/1984 | Leining |
| 4,631,780 | A | 12/1986 | Leining |
| 4,794,273 | A | 12/1988 | McCullough et al. |
| 4,894,915 | A | 1/1990 | Decker et al. |
| 7,326,107 | B2 * | 2/2008 | Finney .................. A22B 5/10 452/86 |
| 8,002,779 | B2 | 8/2011 | Barker et al. |
| 8,608,755 | B2 | 12/2013 | Mahaffey et al. |
| 8,814,881 | B2 | 8/2014 | Boles |
| 8,926,632 | B2 | 1/2015 | Mahaffey et al. |
| 9,121,438 | B2 | 9/2015 | Mascari |
| 9,265,263 | B2 | 2/2016 | Whited et al. |
| 9,480,263 | B2 * | 11/2016 | Van Der Leest ...... A22B 5/166 |
| 9,516,887 | B1 | 12/2016 | Ewers |
| 9,913,482 | B2 | 3/2018 | Karubian |
| 10,731,713 | B1 | 8/2020 | Gall et al. |
| 11,026,434 | B2 | 6/2021 | Sukey |
| 2004/0187316 | A1 | 9/2004 | Whited et al. |
| 2004/0216976 | A1 | 11/2004 | Droste |
| 2009/0138027 | A1 | 5/2009 | Lucas et al. |
| 2009/0157095 | A1 | 6/2009 | Barker et al. |
| 2014/0236180 | A1 | 8/2014 | Shafirstein et al. |
| 2016/0031103 | A1 | 2/2016 | Mascari et al. |
| 2016/0174581 | A1 | 6/2016 | Van Der Leest et al. |
| 2017/0142985 | A1 | 5/2017 | Chappell, Jr. |
| 2019/0069564 | A1 | 3/2019 | Sukey |
| 2020/0288727 | A1 | 9/2020 | Chappell |

OTHER PUBLICATIONS

Instruction Manual for Zimmer™ Air Dermatome, Manufactured by Zimmer Surgical, Inc., Dover, OH, Copyright 1992 (127 pages) (Exhibit B).

Operator's Manual, Integra™ Model SB Dermatome, Manufactured by Integra Life Sciences Corporation, Plainsboro, New Jersey, Copyright 2005 (6 pages) (Exhibit C).

International Brochure for Humeca Dermatome Blades, Manufactured by Humeca BV, Enschede, The Netherlands, publication date Oct. 2008 (1 page) (Exhibit D).

International Search Report and Written Opinion of the International Searching Authority dated Oct. 22, 2021 for PCT International Application No. PCT/US2021/042219, filed Jul. 19, 2021. PCT International Application No. PCT/US2021/042219 corresponds to and claims priority from the present application (9 pages) (Exhibit E).

* cited by examiner

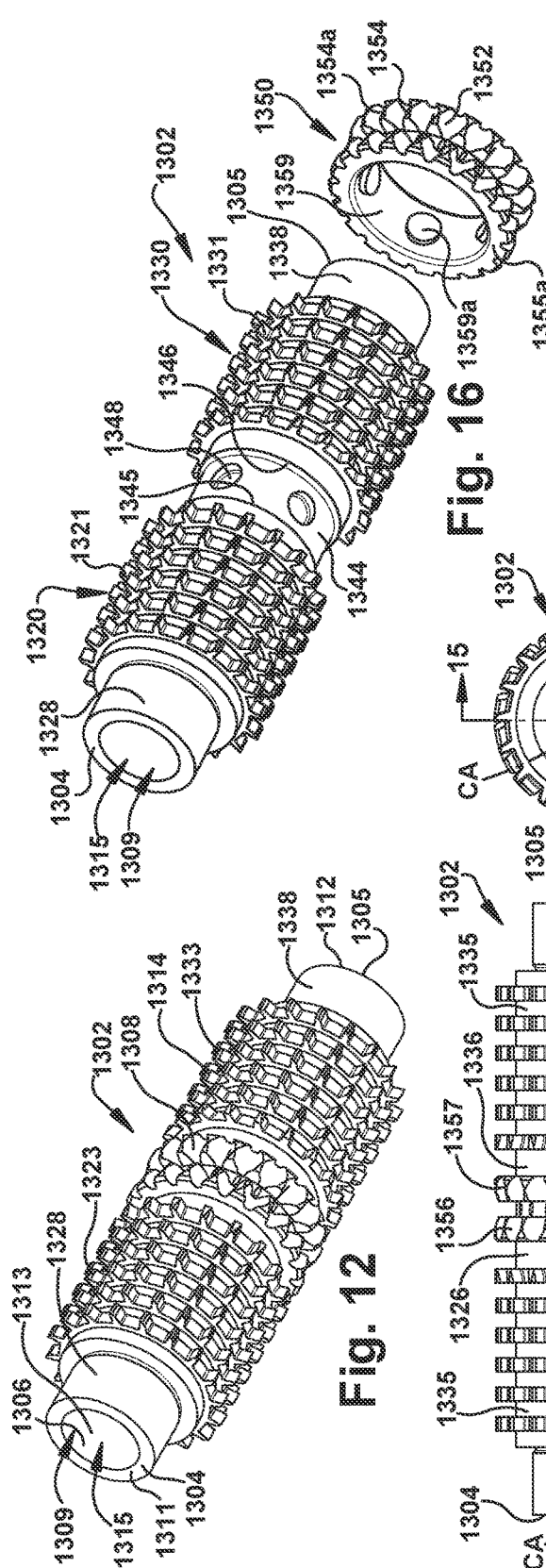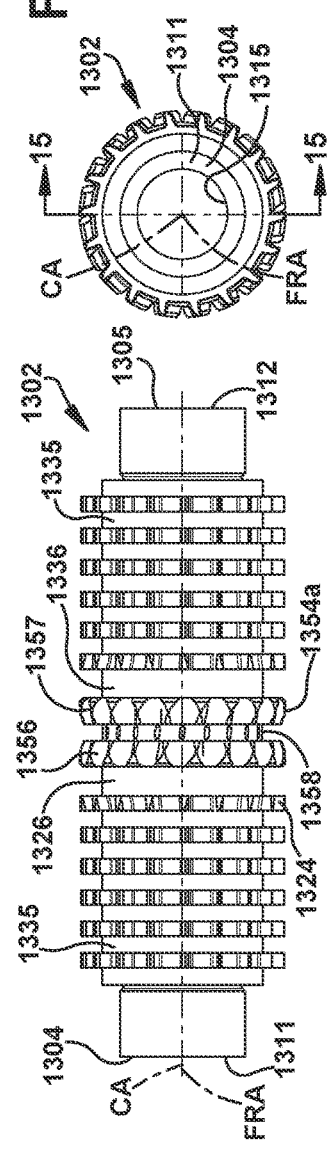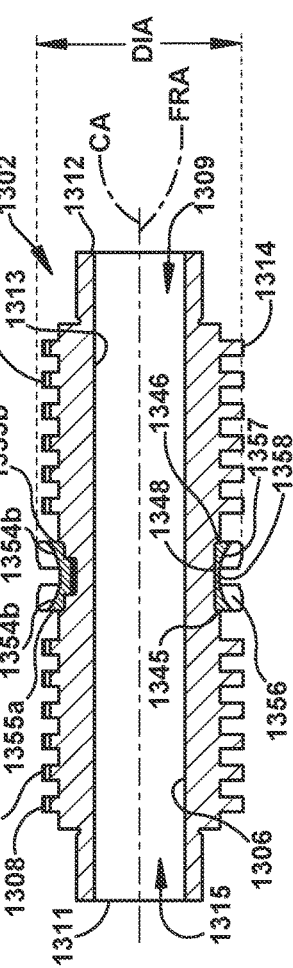

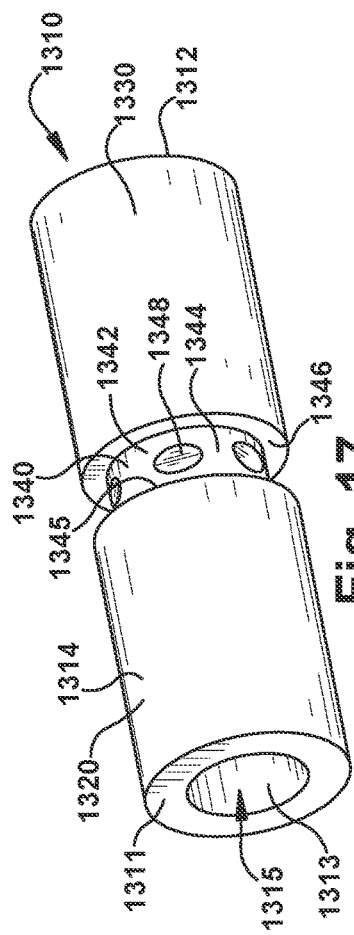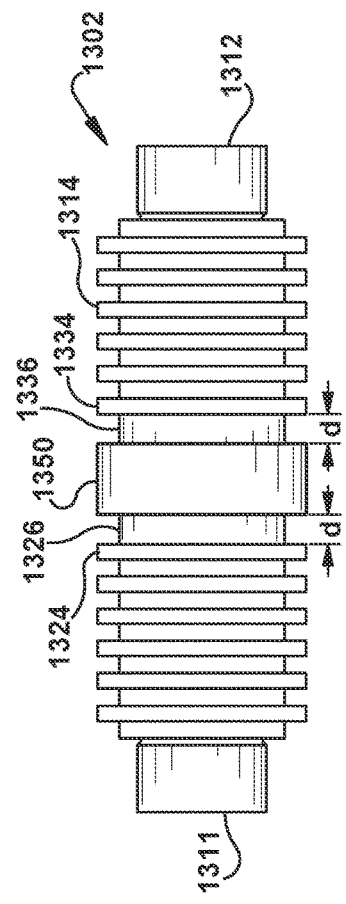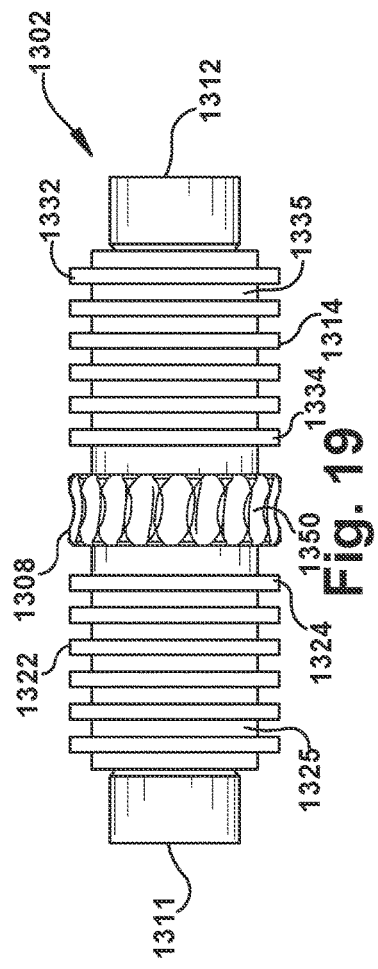

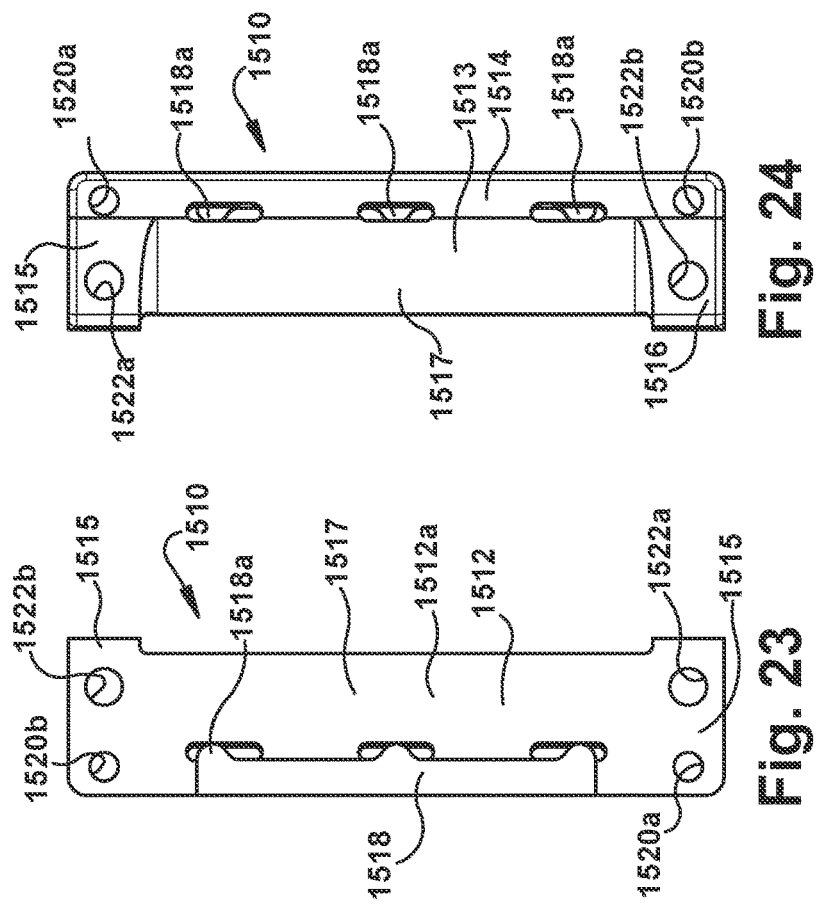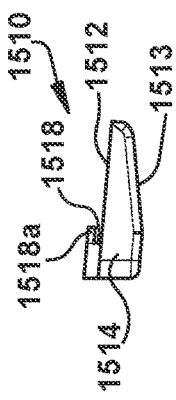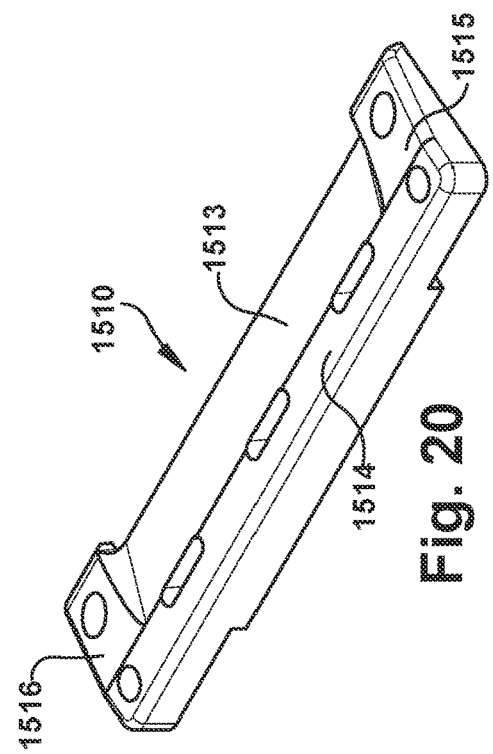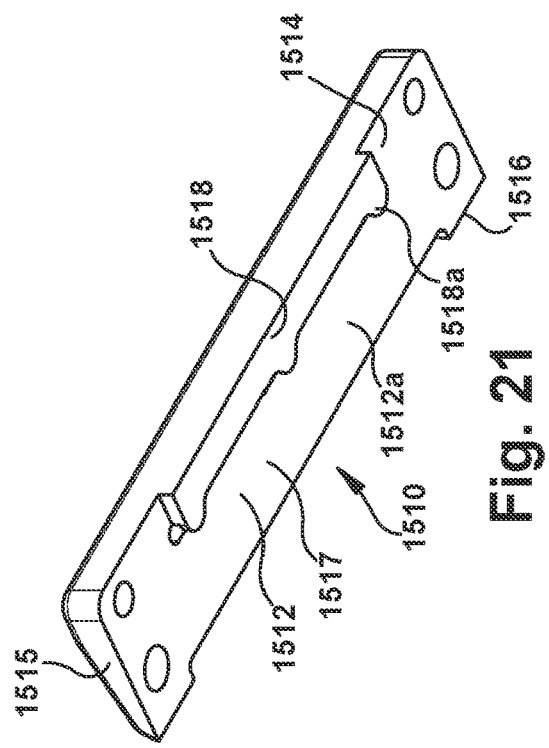

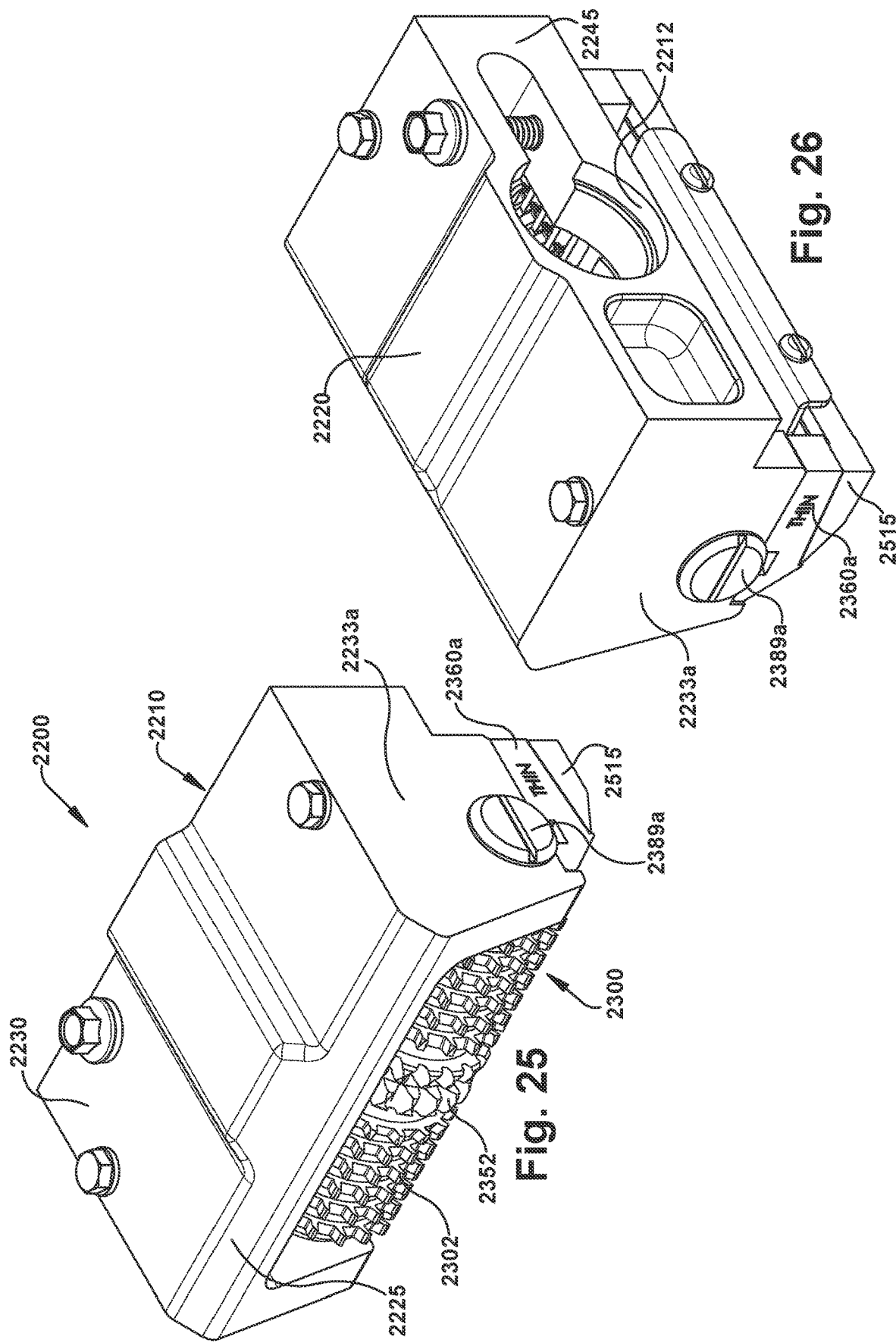

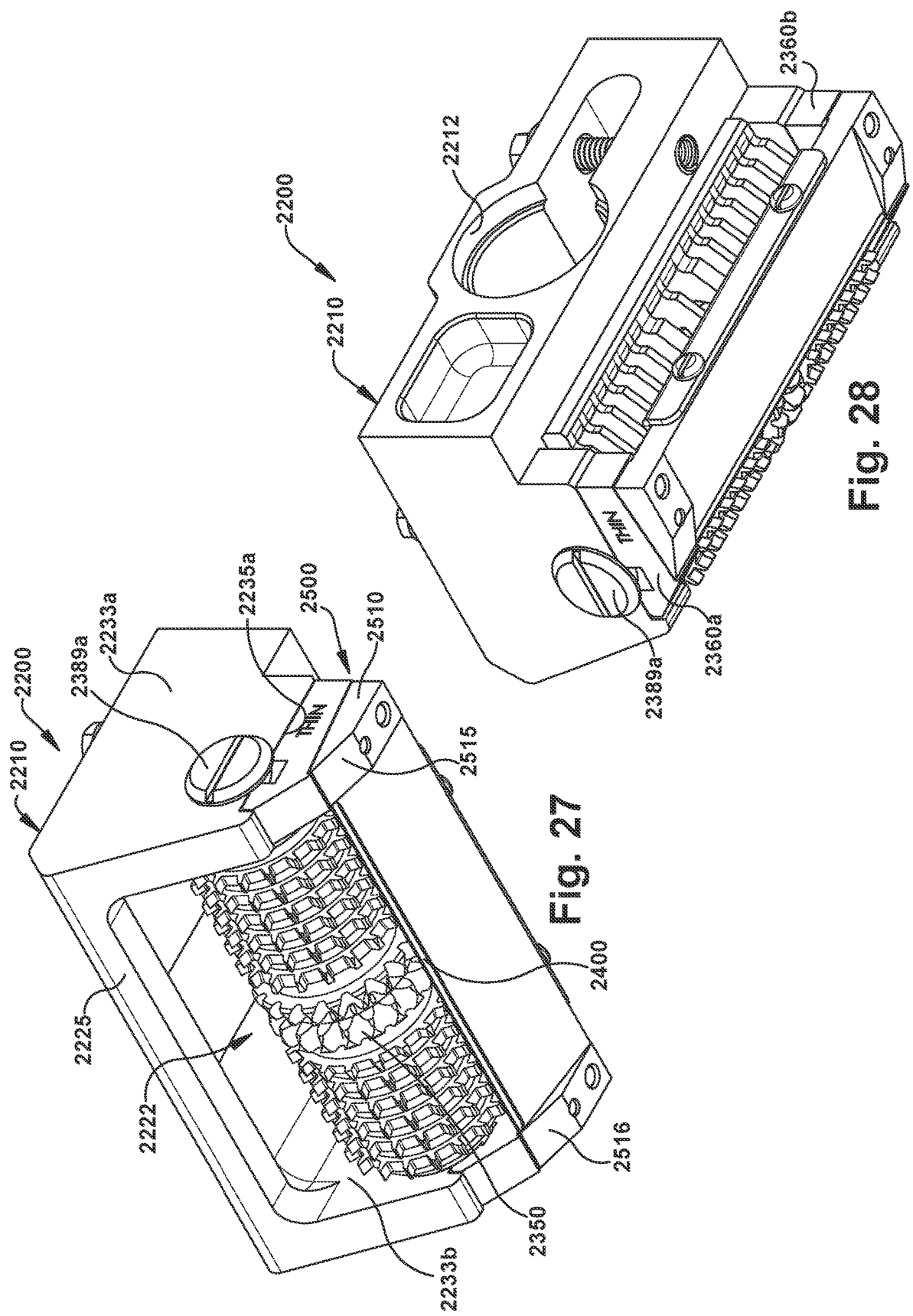

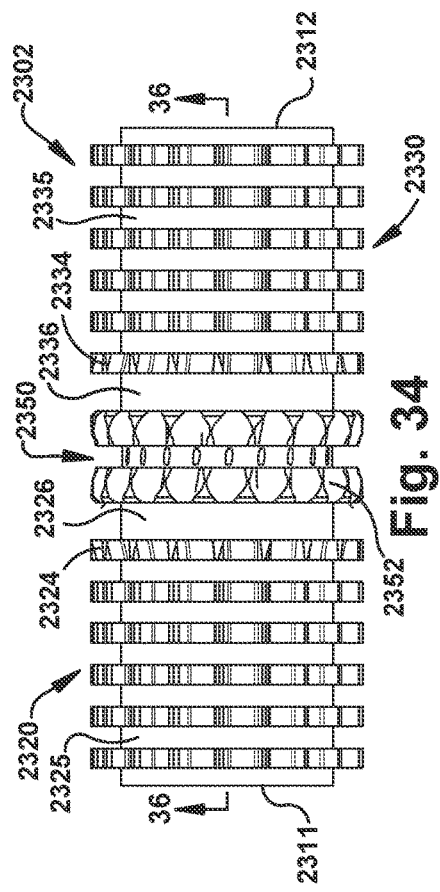
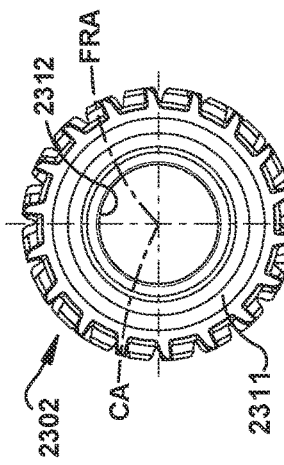
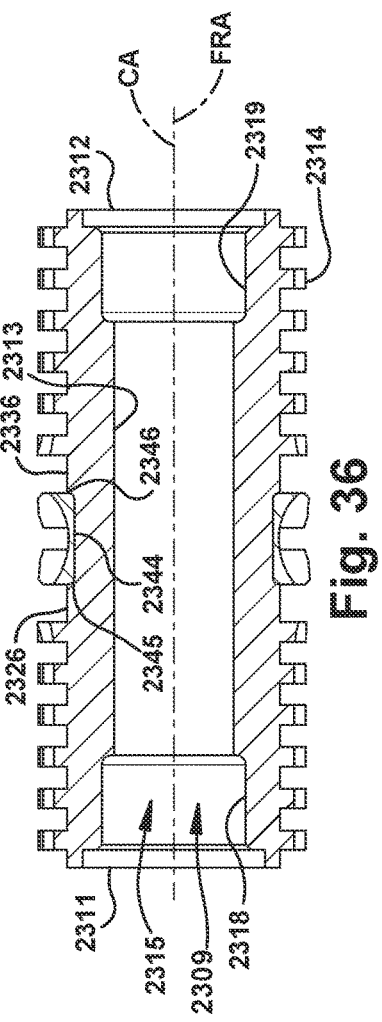
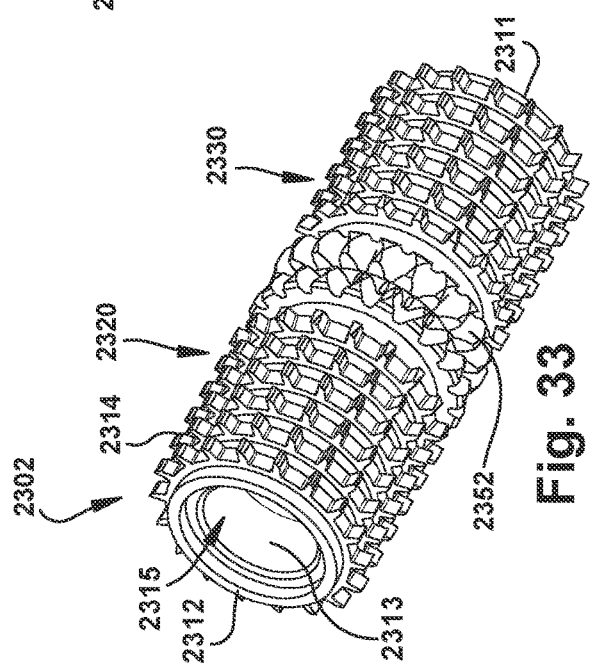

FEED ROLL FOR POWER OPERATED TRIMMING TOOL

CROSS REFERENCE TO RELATED APPLICATION

The following application claims priority under 35 U.S.C. § 119(e) to U.S. Provisional Patent Application Ser. No. 63/054,753, filed Jul. 21, 2020, entitled Feed Roll For Power Operated Trimming Tool. The above-identified U.S. provisional patent application is incorporated by reference herein in its entirety for any and all purposes.

TECHNICAL FIELD

The present disclosure relates to a power-driven, rotating feed roll for a hand-held, power operated tool used for trimming a workpiece, such as an animal carcass or meat product, by removing or trimming an outer layer of tissue from the carcass or meat product, the power operated trimming tool including a stationary or fixed blade and a one-piece feed roll for engaging and advancing a layer of tissue toward the fixed blade for cutting the layer of tissue from the workpiece.

BACKGROUND

Power operated skinning devices or trimming tools are used for various trimming operations in meat processing facilities, for example, to remove a layer of tissue, such as a layer of skin or fat from an animal carcass or meat product. Such devices are disclosed, for example, in U.S. Pat. No. 11,026,434 to Sukey, U.S. Pat. No. 10,731,713 to Gall et al., U.S. Pat. No. 4,186,461 to Leining, U.S. Pub. No. US 2016/0174581 A1 to Van Der Leest et al., and U.S. Pat. No. 9,516,887 to Ewers. Such devices typically include a power-driven, rotating tooth roll or feed roll which engages and advances an outer layer of tissue or skin of the animal carcass or product toward a fixed or stationary cutting blade which severs the outer layer of tissue from the remaining tissue of the animal carcass or product. The feed roll may be driven by a motor, such as a pneumatic or electric motor, disposed in a handle of the device. Alternately, the feed roll may be driven by a flexible shaft drive transmission coupled between an external motor and the handle of the device, a rotating drive shaft of the flexible shaft drive transmission extends through a through bore in the handle of the device and is operatively connected to a drive mechanism of the device, rotation of the drive shaft by the electric motor, in turn, causes a worm gear of the drive mechanism to rotate the feed roll. Such a configuration utilizing a flexible drive shaft transmission is disclosure in the aforesaid U.S. Pat. No. 11,026,434 to Sukey, issued Jun. 8, 2021 and U.S. Pat. No. 10,731,713 to Gall et al., issued Aug. 4, 2020, both of which are assigned to the assignee of the present invention and both of which are incorporated herein in their respective entireties by reference.

SUMMARY

In one aspect, the present disclosure relates to a power-driven feed roll for rotation about a feed roll axis of rotation in a power operated trimming tool, the power-driven feed roll comprising: a cylindrical core including a first end and a spaced apart second end and an inner surface and a radially spaced apart outer surface, the inner surface defining a central through bore extending along the feed roll axis of rotation, the outer surface of the cylindrical core including a central portion centered between the first and second ends and including a recess bounded by a base and first and second radially extending side walls at opposite ends of the base, a first flanking portion extending between the first end and the central portion and a second flanking portion extending between the second end and central portion; and a drive gear formed over the recess of the central portion and integral with the cylindrical core, the drive gear extending along the first and second radially extending side walls of cylindrical recess and protruding radially outwardly, the first flanking portion including a first plurality of annular sets of drive teeth, each of the first plurality of annular sets of drive teeth including a plurality of circumferentially spaced apart drive teeth, the second flanking portion including a second plurality of annular sets of drive teeth, each of the second plurality of annular sets of drive teeth including a plurality of circumferentially spaced apart drive teeth.

In another aspect, the present disclosure relates to a power operated trimming tool comprising: an elongated handle assembly including a through bore extending along a longitudinal axis of the handle assembly; a drive mechanism; a head assembly affixed to the handle extension of the handle assembly, the head assembly including a frame body supporting a feed roll and a blade; the feed roll driven about a feed roll axis of rotation by the drive mechanism, the feed roll including: a cylindrical core including a first end and a spaced apart second end and an inner surface and a radially spaced apart outer surface, the inner surface defining a central through bore extending along the feed roll axis of rotation, the outer surface of the cylindrical core including a central portion centered between the first and second ends and including a recess bounded by a base and first and second radially extending side walls at opposite ends of the base, a first flanking portion extending between the first end and the central portion and a second flanking portion extending between the second end and central portion; and a drive gear formed over the recess of the central portion and integral with the cylindrical core, the drive gear extending along the first and second radially extending side walls of cylindrical recess and protruding radially outwardly, an outer surface of the drive gear driving the feed roll about the feed roll axis of rotation, the first flanking portion including a first plurality of annular sets of drive teeth, each of the first plurality of annular sets of drive teeth including a plurality of circumferentially spaced apart drive teeth, the second flanking portion including a second plurality of annular sets of drive teeth, each of the second plurality of annular sets of drive teeth including a plurality of circumferentially spaced apart drive teeth.

In another aspect, the present disclosure relates to a feed roll driven for rotation about a feed roll axis of rotation in a power operated trimming tool, the feed roll comprising: a cylindrical core including a first end and a spaced apart second end and an inner surface and a radially spaced apart outer surface, the inner surface defining a central through bore extending along the feed roll axis of rotation, the outer surface of the cylindrical core including a central portion centered between the first and second ends and including a recess bounded by a base and first and second radially extending side walls at opposite ends of the base, a first flanking portion extending between the first end and the central portion and a second flanking portion extending between the second end and central portion; and a drive gear formed over the recess of the central portion and integral with the cylindrical core, the drive gear extending along the first and second radially extending side walls of cylindrical recess and protruding radially outwardly, the first flanking portion including a plurality of circumferentially spaced apart drive teeth, the second flanking portion including a plurality of circumferentially spaced apart drive teeth.

BRIEF DESCRIPTION OF THE DRAWINGS

The foregoing and other features and advantages of the present disclosure will become apparent to one skilled in the art to which the present disclosure relates upon consideration of the following description of the disclosure with reference to the accompanying drawings, wherein like reference numerals, unless otherwise described refer to like parts throughout the drawings and in which:

FIG. 12 is schematic bottom, front perspective view a power-driven feed roll of the feed roll assembly of the power operated trimming tool of FIG. 1;

FIG. 13 is a schematic front elevation view of the feed roll of FIG. 12;

FIG. 14 is a schematic side elevation view of the feed roll of FIG. 12;

FIG. 15 is a schematic longitudinal vertical section view of the feed roll of FIG. 12, as seen from a plane indicated by the line 15-15 in FIG. 14;

FIG. 16 is a schematic exploded bottom, front perspective view of the feed roll of FIG. 12, showing a cylindrical core of the feed roll and an annular drive member which is integrally cast onto a cylindrical recess of a central portion of an outer surface of the cylindrical core, for illustration purposes, the annular drive member being shown as separated from the cylindrical core;

FIG. 17 is a schematic top, front perspective view of the cylindrical core of the feed roll of FIG. 12, as would appear during a processing step in fabrication of the feed roll;

FIG. 18 is a schematic front elevation view of the feed roll of FIG. 12, an annular drive member cast onto the central portion of the outer surface of the cylindrical core of FIG. 17 and partial machining of first and second flanking portions of the outer surface of the cylindrical core, as would appear during a processing step in fabrication of the feed roll;

FIG. 19 is a schematic front elevation view of the feed roll of FIG. 12, with partial machining of the annular drive member cast onto the central portion of the outer surface of the cylindrical core and partial machining of first and second flanking portions of the outer surface of the cylindrical core, as would appear during a processing step in fabrication of the feed roll;

FIG. 20 is a schematic bottom, rear perspective view of a blade retainer plate of a blade retainer assembly of the power operated trimming tool of FIG. 1;

FIG. 21 is a schematic top, front perspective view of the blade retainer plate of FIG. 20;

FIG. 22 is a schematic side elevation view of the blade retainer plate of FIG. 20;

FIG. 23 is a schematic top plan view of the blade retainer plate of FIG. 20;

FIG. 24 is a schematic bottom plan view of the blade retainer plate of FIG. 20;

FIG. 25 is a schematic top, front perspective view of a second exemplary embodiment of a head assembly for a power operated trimming tool, the head assembly of the present disclosure including a frame body, a feed roll assembly including a power-driven feed roll, a fixed blade having a cutting edge, and a blade support assembly for supporting the blade in a fixed position with respect to the rotating feed roll;

FIG. 26 is a schematic top, rear perspective view of the head assembly of FIG. 25;

FIG. 27 is a schematic bottom, front perspective view of the head assembly of FIG. 25;

FIG. 28 is a schematic bottom, rear perspective view of the head assembly of FIG. 25;

FIG. 33 is schematic bottom, front perspective view the power-driven feed roll of the feed roll assembly of the head assembly of FIG. 25;

FIG. 34 is a schematic front elevation view of the feed roll of FIG. 33;

FIG. 35 is a schematic side elevation view of the feed roll of FIG. 33;

FIG. 36 is a schematic longitudinal vertical section view of the feed roll of FIG. 33, as seen from a plane indicated by the line 36-36 in FIG. 34.

Figure 1:
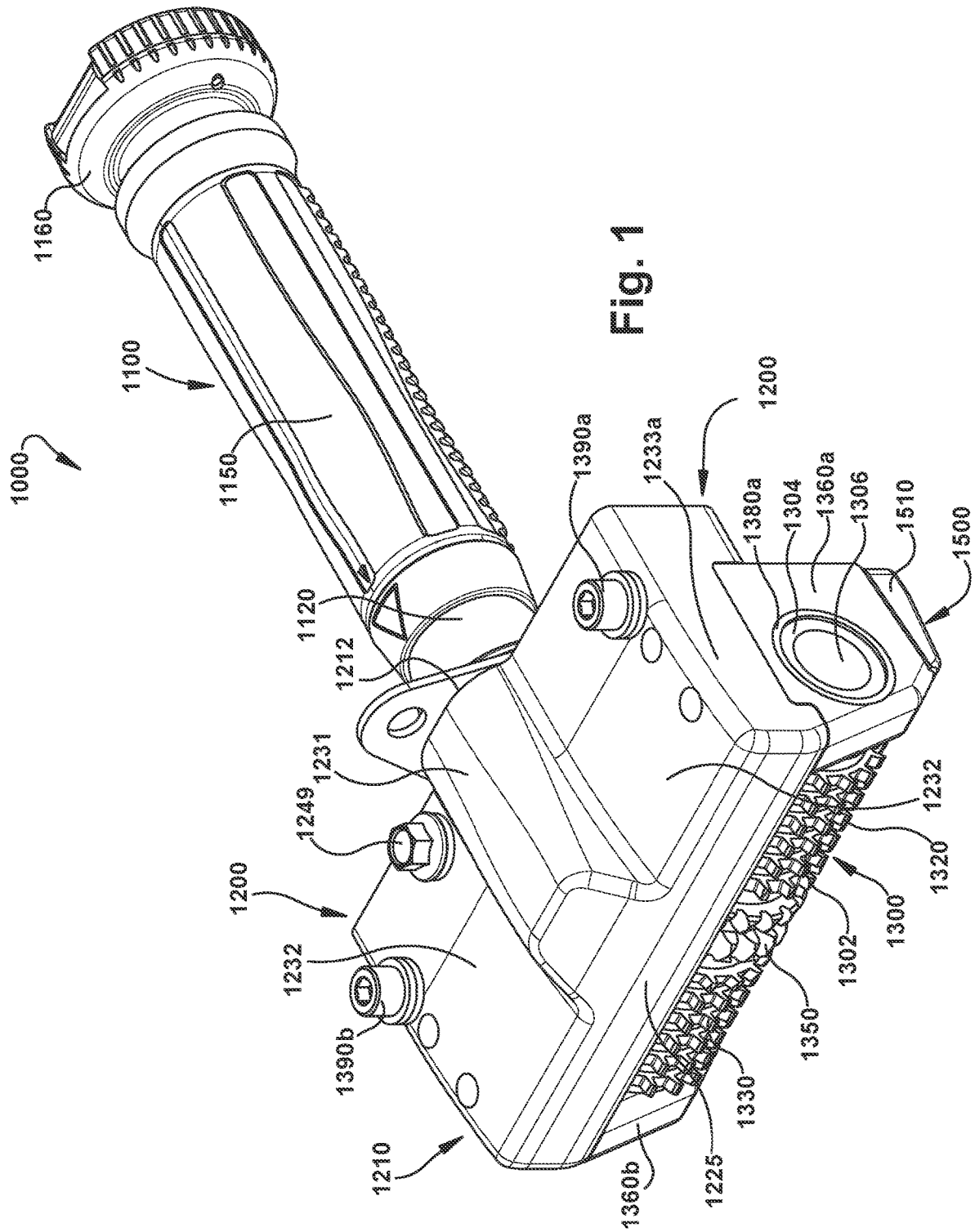
FIG. 1 is a schematic top, front perspective view of a first exemplary embodiment of a hand-held, power operated trimming tool of the present disclosure including a handle assembly supporting a drive mechanism to rotate a power-driven feed roll of a feed roll assembly about a feed roll axis of rotation and a head assembly, including a frame body, the feed roll assembly including the power-driven feed roll, a fixed blade having a cutting edge, and a blade support assembly for supporting the blade in a fixed position with respect to the rotating feed roll.
Figure 2:
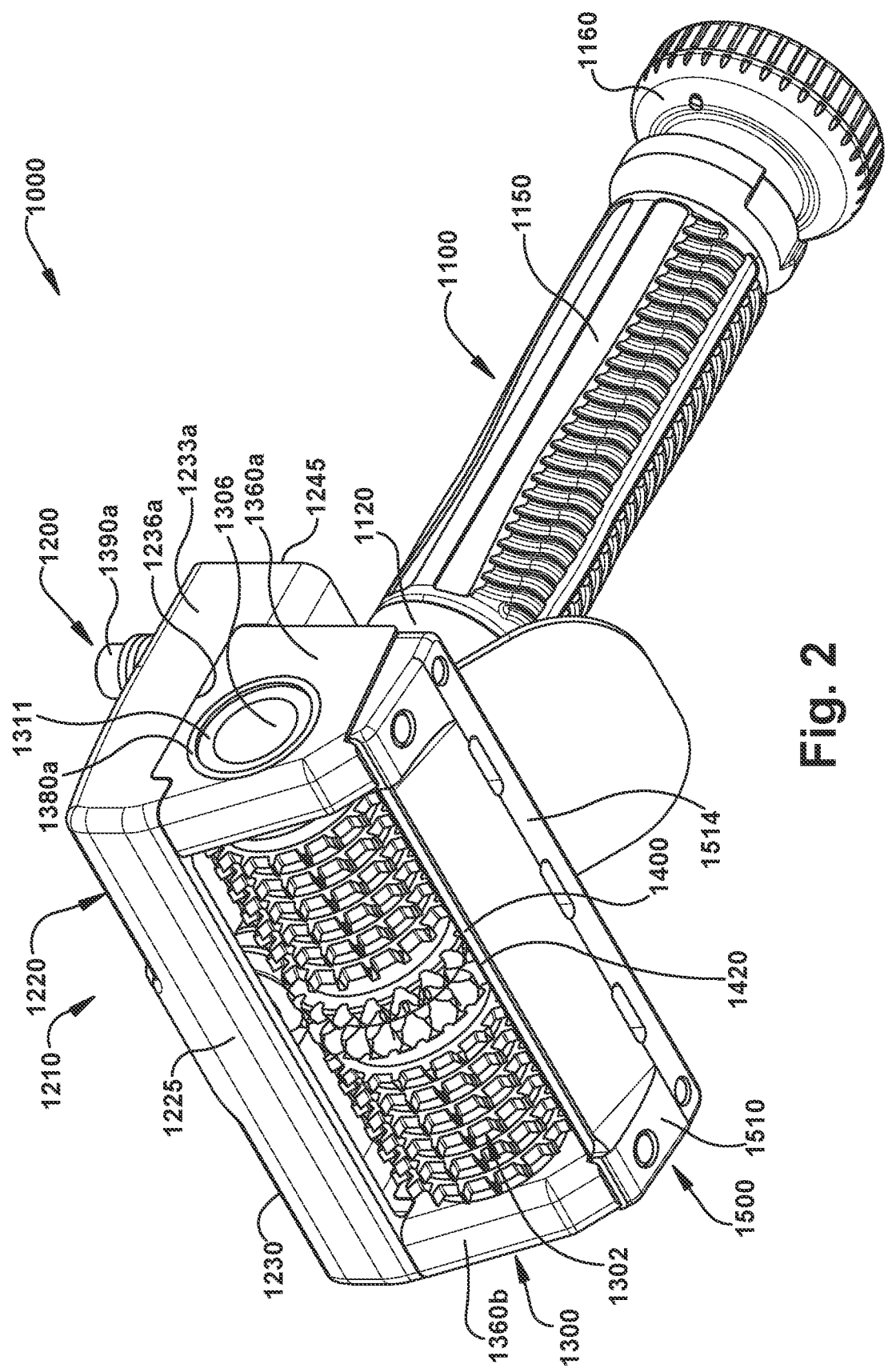
FIG. 2 is a schematic bottom, front perspective view of the power operated trimming tool of FIG. 1.
Figure 3:
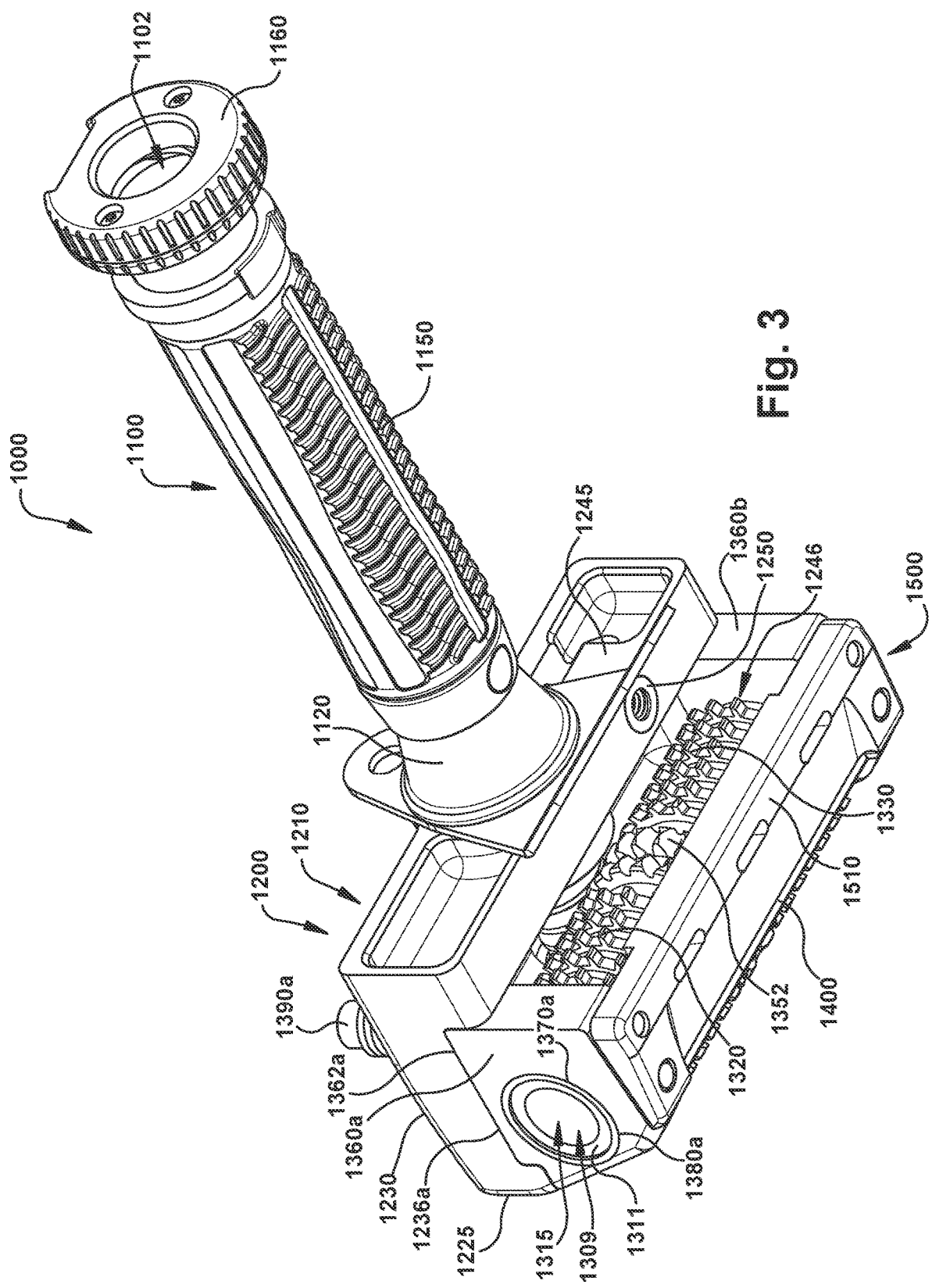
FIG. 3 is a schematic bottom, rear perspective view of the power operated trimming tool of FIG. 1.
Figure 4:
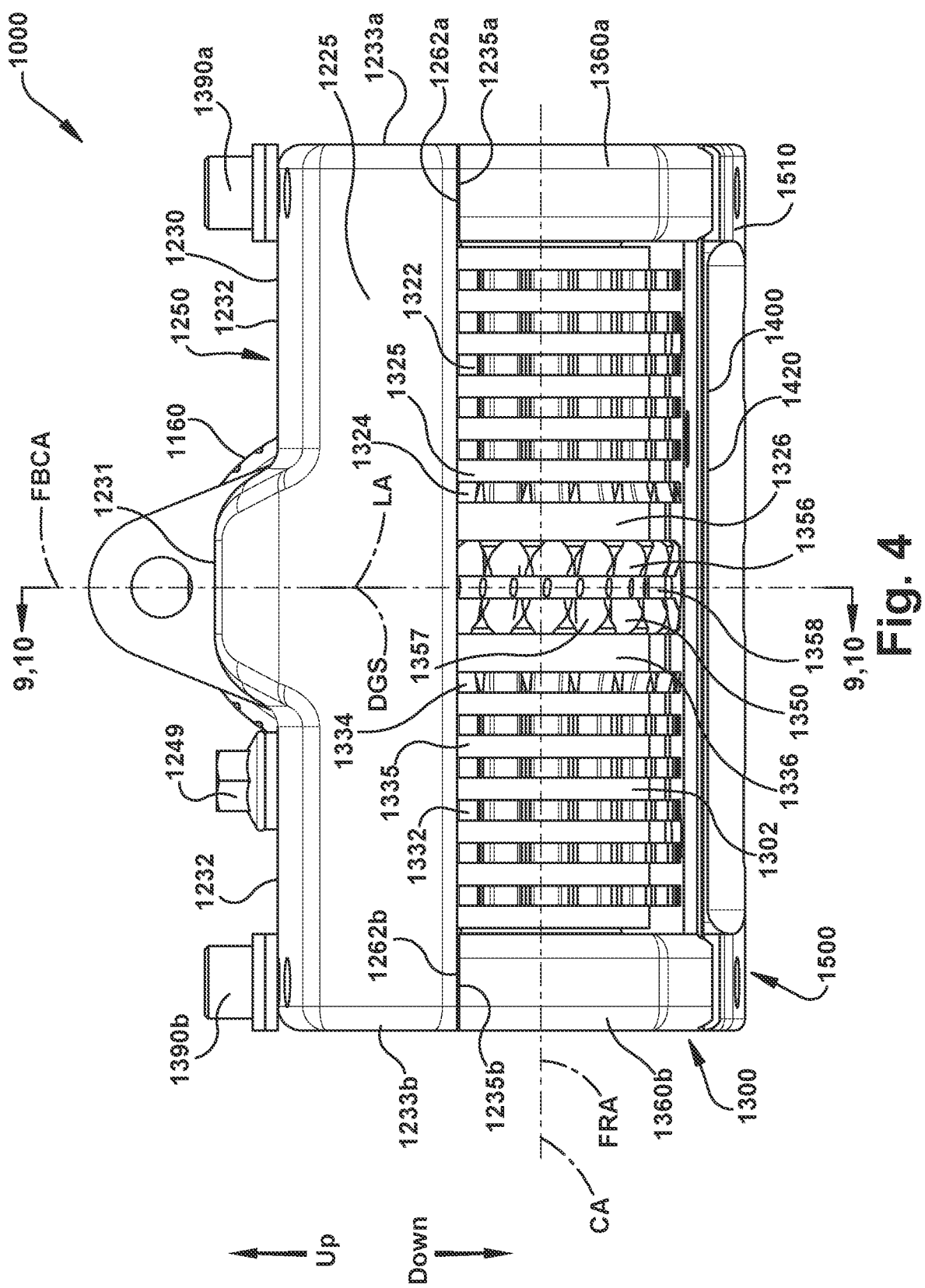
FIG. 4 is a schematic front elevation view of the power operated trimming tool of FIG. 1.

Skilled artisans will appreciate that elements in the Figures are illustrated for simplicity and clarity and have not necessarily been drawn to scale. For example, the dimensions of some of the elements in the Figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

First Exemplary Embodiment—Power Operated Trimming Tool 1000

The present disclosure relates to a hand-held, power operated trimming tool, shown generally at 1000, in FIGS. 1-11. In first exemplary embodiment, the hand-held, power operated trimming tool 1000 is a power operated skinning device including a power-driven, rotating, one-piece feed roll 1302 and a stationary cutting blade 1400. As the power-driven feed roll 1302 is rotatably driven about a feed roll axis of rotation FRA, projecting annular sets of drive teeth 1322, 1332 of the feed roll 1302 engage and advance an outer layer of tissue or skin of a workpiece (not shown) such as, an animal carcass or meat product, for example, a hog carcass or a pork loin product, toward the stationary cutting blade 1400. As the operator moves the power operated trimming tool 1000 along an outer surface of a workpiece, the cutting blade 1400 cuts or severs the outer layer of tissue or skin from the remainder of the workpiece, thereby obtaining a trimmed workpiece, such as a trimmed carcass or trimmed meat product. The operator may manipulate the power operated trimming tool 1000 to repeat the cutting or trimming process on the workpiece until a desired trimmed carcass or product is obtained.

In one exemplary embodiment, the power operated trimming tool 1000 includes a longitudinally extending handle assembly 1100 and a head assembly 1200 coupled to and extending from a distal end portion 1106 of the handle assembly 1100. The head assembly 1200 includes a frame body 1210 that supports various components of the head assembly 1200 including a feed roll assembly 1300, a stationary cutting blade 1400 and a blade retainer assembly 1500. The feed roll assembly 1300 includes the power-driven, one-piece feed roll 1302 of the present disclosure which is rotationally driven about the feed roll axis of rotation FRA by a drive mechanism 1600 of the power operated trimming tool 1000. The drive mechanism 1600 is rotatably supported by a handle extension 1120 of the handle assembly 1100 and the drive mechanism 1600 includes drive gear 1602 having a central intermediate shaft 1610 and a worm gear driver or worm screw 1620 extending from a distal end portion 1612 of the intermediate shaft 1610. The worm screw 1620 extends into an interior region 1222 of a support portion 1120 of the frame body 1210 and is positioned to operatively engage a driven gear of the feed roll 1302 such that, as the drive gear 1602 of the drive mechanism 1600 is driven to rotate about a drive gear axis of rotation DGA, the worm screw 1620 engages the driven gear of the feed roll and rotates the feed roll 1302 about its axis of rotation FRA. As the feed roll 1302 is driven for rotation about a feed roll axis of rotation FRA by the drive mechanism 1600 of the power operated trimming tool 1000, the operator moves or manipulates the power operated trimming tool 1000 to move along an outer surface of the workpiece. The annular sets of drive teeth 1322, 1332 of the feed roll 1302 engage and advance an outer layer of tissue or skin of the workpiece (animal carcass/meat product) toward the stationary cutting blade 1400 thereby severing the outer layer of tissue from the remaining tissue of the animal carcass/meat product. As used herein, the driven gear of the feed roll 1302, as referred to above, will be referred to as an annular drive gear or annular drive member 1350 of the feed roll 1302.

In one exemplary embodiment, the drive gear 1602 of the drive mechanism 1600 of the power operated trimming tool 1000 is driven by an external motor (not shown) coupled to the drive mechanism 1600 of the handle assembly 1100 through a flexible shaft drive transmission (not shown) that mechanically couples a rotating output drive shaft of the external motor to rotate the drive gear 1602 of the drive mechanism 1600 about the drive gear axis of rotation DGA and thereby rotate the feed roll 1302 about its axis of rotation FRA. The external motor is remote from the power operated trimming tool 1000 thereby advantageously providing for a lighter weight for the power operated trimming tool compared to, for example, a power operated trimming tool wherein a pneumatic or electric motor is mounted in a handle assembly of the trimming tool. As an operator must manipulate the trimming tool 1000 to properly orient and move the tool 1000 when cutting a layer of tissue from a workpiece, a reduction in weight of the tool 1000 reduces operator fatigue and provides for increased operator productivity over a work shift. Additionally, and advantageously, the drive mechanism 1600 of the power operated trimming tool 1000 may be configured to provide an optimal rotational speed for the feed roll 1302 such a desired linear feed rate, as measured at an outer surface 1308 of the feed roll 1302 may be achieved given the characteristics of the workpiece to be cut or trimmed, i.e., removing or trimming an outer layer of fat tissue from a hog carcass or a pork loin product. Specific details of the external motor, the flexible shaft drive transmission and the drive assembly may be found in previously referenced and incorporated by reference U.S. Pat. No. 11,026,434 to Sukey, issued Jun. 8, 2021 and U.S. Pat. No. 10,731,713 to Gall et al., issued Aug. 4, 2020, both assigned to the assignee of the present application.

The present disclosure relates to the feed roll assembly 1300 of the power operated trimming tool 1000 and, more specifically, to the one-piece power-driven feed roll 1302. The power-driven feed roll 1302 of the present disclosure include a cylindrical core 1310 and the annular drive member or annular drive gear 1350 formed by casting over an outer surface 1314 of the cylindrical core 1310 thereby permanently adhering the annular drive gear 1350 to the cylindrical core 1310 to form the integral, one-piece feed roll 1302. In one exemplary embodiment, the annular drive gear or drive member 1350 of the feed roll 1302 is a worm gear or worm wheel 1352 which is cast over a cylindrical recess 1342 of a central portion 1340 of an outer surface 1314 of the cylindrical core 1310. The casting process results in the integral, one-piece feed roll 1302 with the annular drive gear 1350, that is, the worm gear 1352, being permanently affixed to or integral with the cylindrical core 1310. As used herein, the term "integral" means the cylindrical core 1310 and the annular drive member are permanently affixed and fabricated or configured in such a way that separation of the cylindrical core 1310 and the annular drive gear 1350 would require destruction of the feed roll 1302.

Advantageously, as compared to prior power-driven feed rolls which comprised multi-part assemblies which were mounted on or to a feed roll shaft, the feed roll 1302 of the present disclosure is a single-piece, unitary or integral structure. As the power operated trimming tool 1000 is typically used in meat trimming/meat cutting applications, the utilization of less component parts in the fabrication of the feed roll 1302 is of significant advantage since fewer component parts results in a lower likelihood that a component part will become detached or dislodged from the feed roll 1302 during cutting and trimming operations. During cutting and trimming operations, power-driven feed rolls may be intermittently subjected to large forces such as would result from impacting or ramming the rotating feed roll into a bone or other rigid structure of a workpiece. Dislodgement or detachment of feed roll components during cutting or trimming operations is an ongoing concern of designers. Any detached/dislodged part or component of a feed roll could potentially end up in a trimmed meat carcass or meat product. Meat processing facilities are understandably anxious to avoid any such potential contamination of trimmed meat products by such detached/dislodged parts. The feed roll 1302 of the present disclosure advantageously addresses this problem by reducing the number of components of the feed roll 1392 to a single, unitary, one-piece structure.

Additionally, prior feed rolls requiring the assembly of multiple parts onto a feed roll shaft results in the build-up of tolerances during assembly of a multi-part feed roll and attendant potential misalignment between the worm gear centered between opposite ends of the feed roll and the worm screw of the drive gear which engages and drives the worm gear. In the one-piece, power-driven feed roll 1302 of the present disclosure, tolerance build-up is eliminated making for a more precisely dimensioned feed roll, which has the worm gear 1352 precisely and accurately centered between opposite ends 1304, 1305 of the feed roll 1302, and therefore properly aligned for driving engagement with the worm gear driver or worm screw 1620 of the drive mechanism 1600 of the power operated trimming tool 1000. Even slight misalignment between the worm screw 1620 of the drive mechanism 1600, which is supported by the handle assembly 1100 of the power operated trimming tool 1000, and the worm gear 1352 of the feed roll 1302, supported by the head assembly 1200, can result in feed roll chatter, increased vibration of the power operated trimming tool 1000 in an operator's hand resulting in operator fatigue, increased generation of heat at the drive interface or engagement between the worm screw 1620 of the drive mechanism 1600 and the worm gear 1352 of the feed roll 1302, and/or premature wear and/or failure of the drive mechanism 1600 or feed roll 1302. Moreover, since the cylindrical core 1310 of the power-driven feed roll 1302 of the present disclosure is fabricated from an alloy steel, in one exemplary embodiment, for example, a stainless steel alloy with good corrosion resistance, and the annular drive gear 1350 is integrally formed by casting a metallic material such as bronze over the core 1310 and then subsequently machining the outer surface 1353 of the overcast bronze drive gear to achieve the desired configuration of the worm gear 1352 and the worm gear teeth 1354, the strength and rigidity of the feed roll 1302 and, specifically, the cylindrical core 1310 is sufficient to eliminate the need for a feed roll shaft. The cylindrical core 1310 is sufficient strong and rigid to be supported at end regions either by outer diameter support of the feed roll end regions (OD support—as will be illustrated by the feed roll 1302 of the first exemplary embodiment) or by inside diameter support of the end regions (ID support—as will be illustrated in a second power-driven, rotating, one-piece feed roll 2302 of a second exemplary embodiment).

Drive Mechanism 1600

Figure 9:
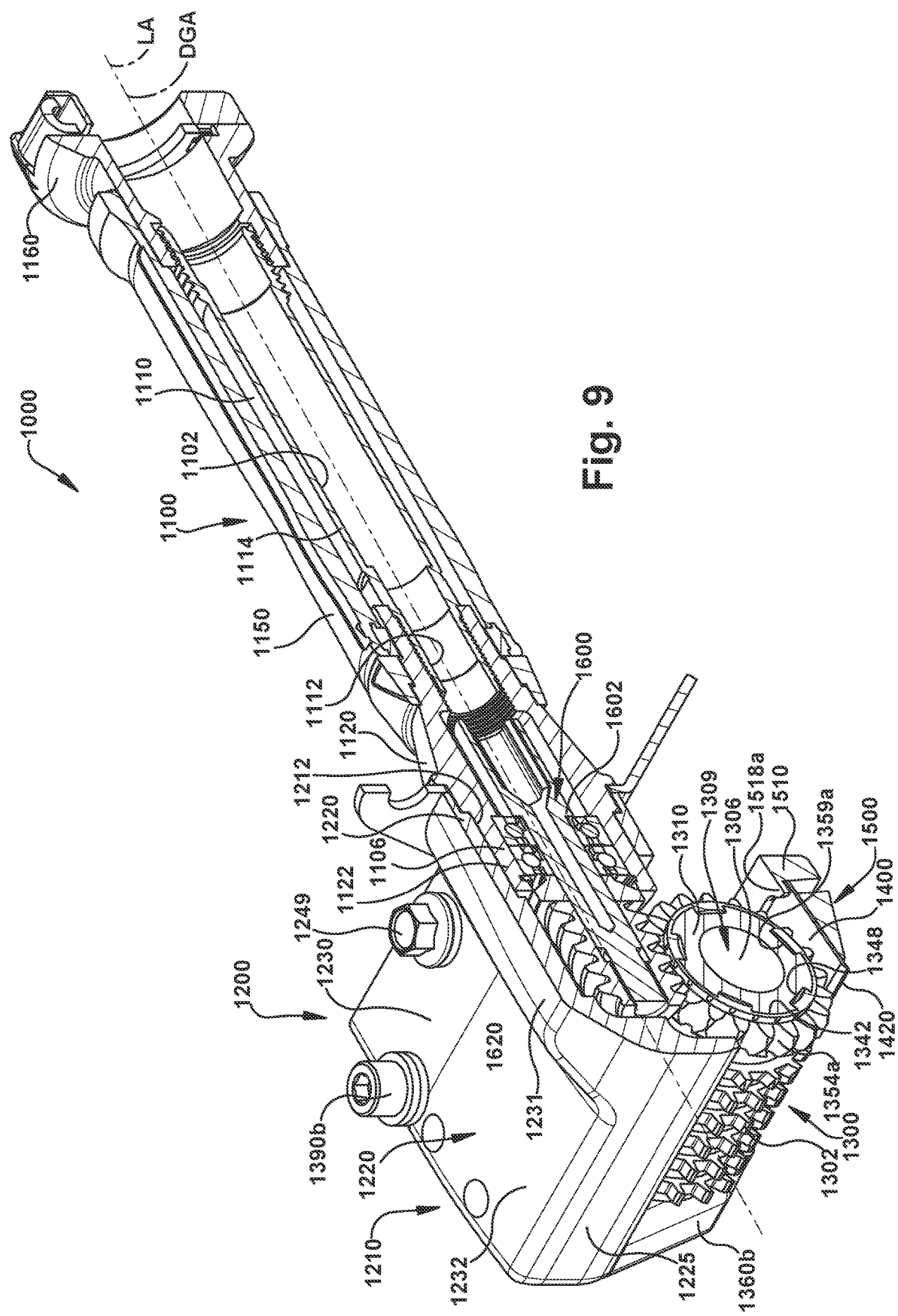
FIG. 9 is a schematic top, front, perspective longitudinal vertical section view of the power operated trimming tool of FIG. 1, as seen from a plane indicated by the line 9-9 in FIG. 4.
Figure 10:
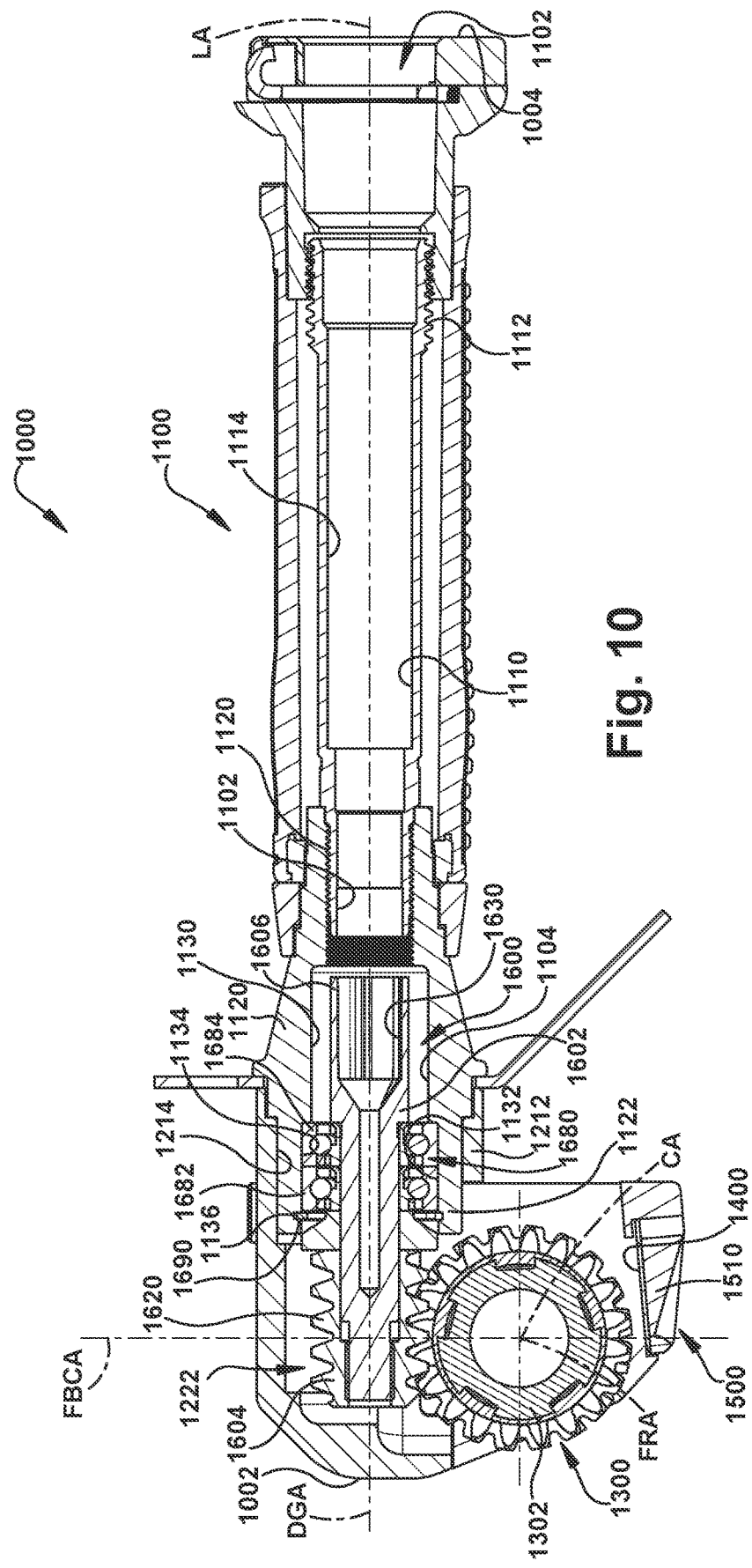
FIG. 10 is a schematic longitudinal vertical section view of the power operated trimming tool of FIG. 1, as seen from a plane indicated by the line 10-10 in FIG. 4.

As best seen in FIGS. 9 and 10, in one exemplary embodiment, the drive mechanism 1600 comprises the drive gear 1602 which supported for rotation about the drive gear axis of rotation DGA by a shaft support assembly 1680 housed a through bore 1102 of the handle assembly 1100 and, more specifically, within the handle extension 1120. The drive gear 1602 includes the central intermediate shaft 1610, the worm gear driver or worm screw 1620 at the distal end portion 1604 of the drive gear 1602 and a driven fitting 1630 at the proximal end portion 1606 of the drive gear 1602. The worm gear driver 1620 at a distal end portion 1604 of the drive gear 1602 operatively engages the worm wheel 1325 formed on the central portion 1320 of the outer surface 1312 of the feed roll 1302. In one exemplary embodiment, a distal portion 1612 of the intermediate shaft 1610 includes an exterior threaded region and the worm screw 1620 is fabricated as a separate component. The worm screw 1620 includes a mating threaded central opening. The threaded central opening of the worm screw 1620 threads onto the threaded region of the intermediate shaft 1610 to secure the worm screw 1620 to the intermediate shaft 1610. The worm screw 1620 includes a disk-shaped locating plate which abut a shoulder of the intermediate shaft proximal to the threaded region to positively locate the worm screw 1620 with respect to a longitudinal extent of the intermediate shaft 1610.

In one exemplary embodiment, the driven fitting 1630 is formed as a socket in an enlarged diameter, proximal end portion 1614 of the intermediate shaft 1610. The driven fitting 1630 is sized to receive a drive fitting of a rotating flex shaft of the flexible shaft drive transmission coupled between the external motor and the handle assembly 1100. When the drive fitting of the flex shaft is operatively engaged with the driven fitting 1630 of the drive gear 1602, rotation of the flex shaft rotates drive gear 1602 about the drive gear axis of rotation DGA. Rotation of the worm gear driver or worm screw 1620 of the drive gear 1602, in turn, helically drives the worm wheel 1352 of the feed roll 1302 causing rotation of the feed roll 1302 about the feed roll axis of rotation FRA.

The intermediate shaft 1610 includes a central cylindrical body 1611, intermediate the proximal and distal end portions 1614, 1612, which is received in the shaft support assembly 1680 to support the drive gear 1602 for rotation about the drive gear axis of rotation DGA. In one exemplary embodiment, the shaft support assembly 1680 advantageously includes the first distal bearing support assembly 1682 and the second proximal bearing support assembly 1684 which support the central cylindrical body 1611 of the intermediate shaft 1610 of the drive gear 1602. In one exemplary embodiment, the first and second bearing support assemblies 1682, 1684 are ball bearing support assemblies and are supported in a bearing seating region 1134 of the handle assembly through bore 1102, more specifically, with a forward portion 1104 of the through bore 1102 defined by a distal section 1132 of an inner surface 1130 of the handle extension 1120 of the handle assembly 1100. Advantageously, by locating the first and second bearing support assemblies 1682, 1684 within the handle through bore 1102, as opposed to the frame body 1210, and locating a driver assembly of a tool end coupling of the flexible shaft drive transmission within the handle through bore 1102, precise longitudinal alignment of the drive gear axis of rotation DGA and an axis of rotation of the flex shaft is facilitated. Proper alignment between the drive gear axis of rotation DGA and the flex shaft axis mitigates undesirable premature component wear, trimming tool chatter and vibration problems that are associated with a misalignment of the drive gear axis of rotation DGA and the flex shaft axis of rotation.

Handle Assembly 1100

Figure 5:
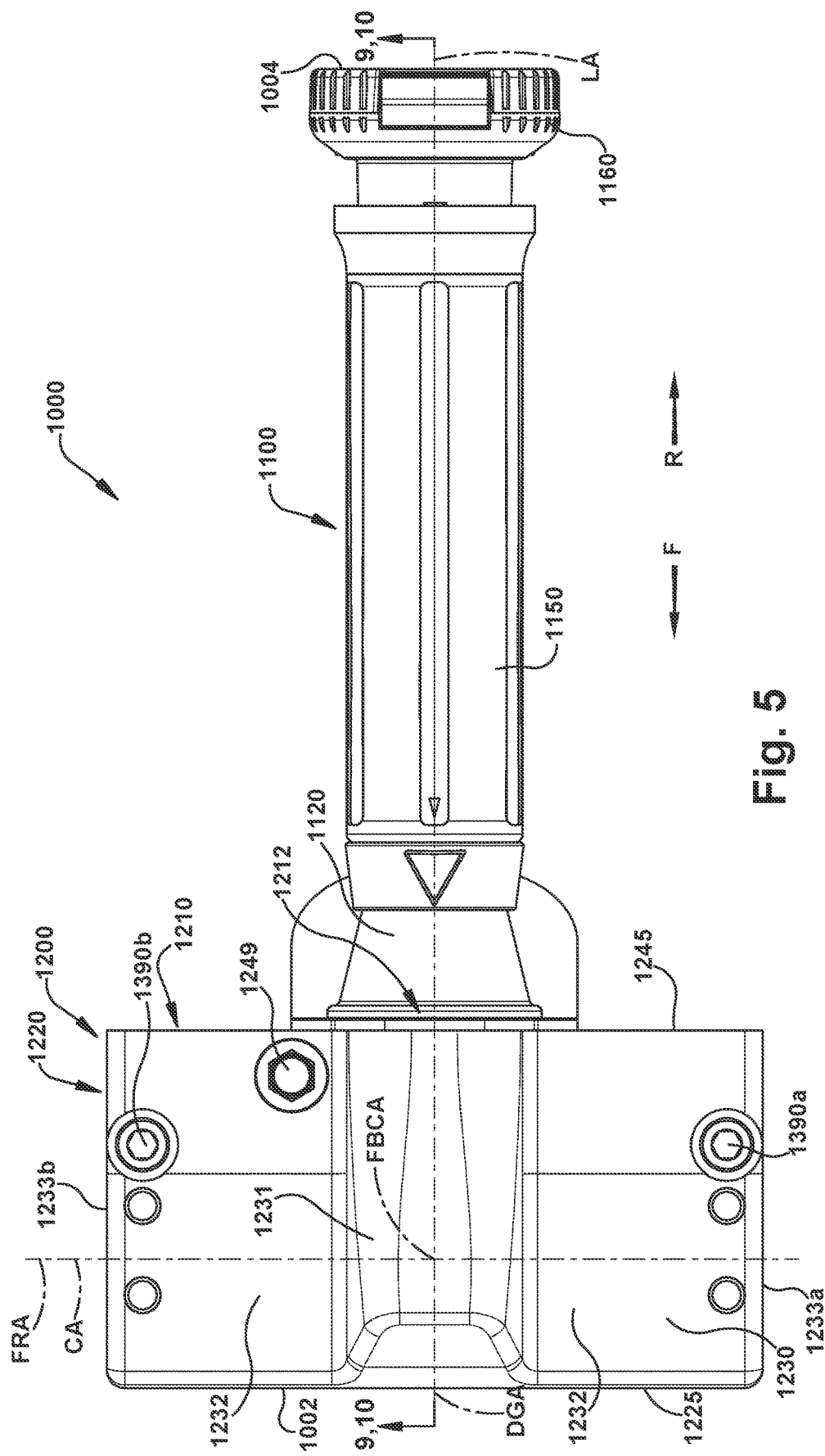
FIG. 5 is a schematic top plan view of the power operated trimming tool of FIG. 1.
Figure 6:
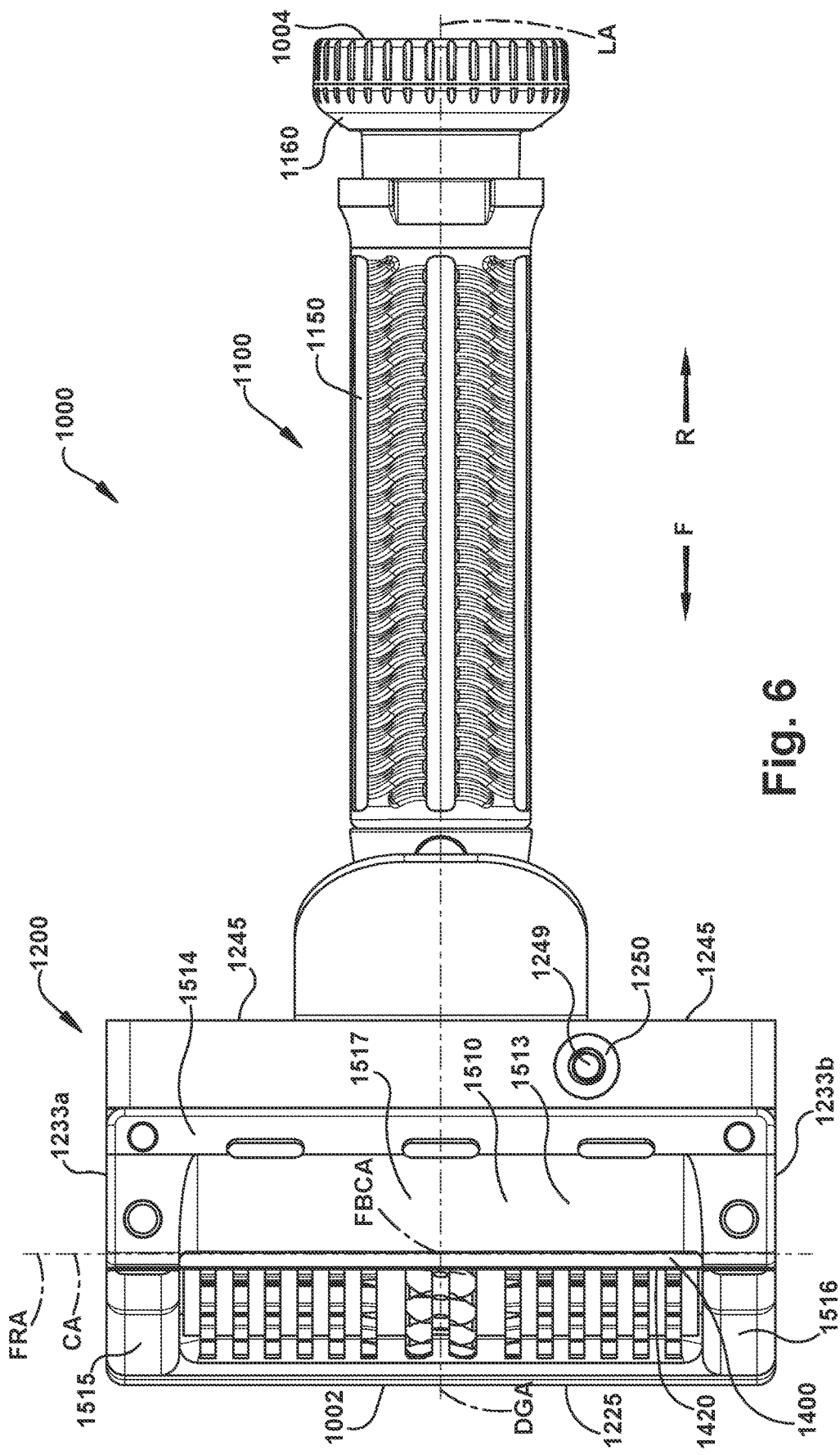
FIG. 6 is a schematic bottom plan view of the power operated trimming tool of FIG. 1.
Figure 7:
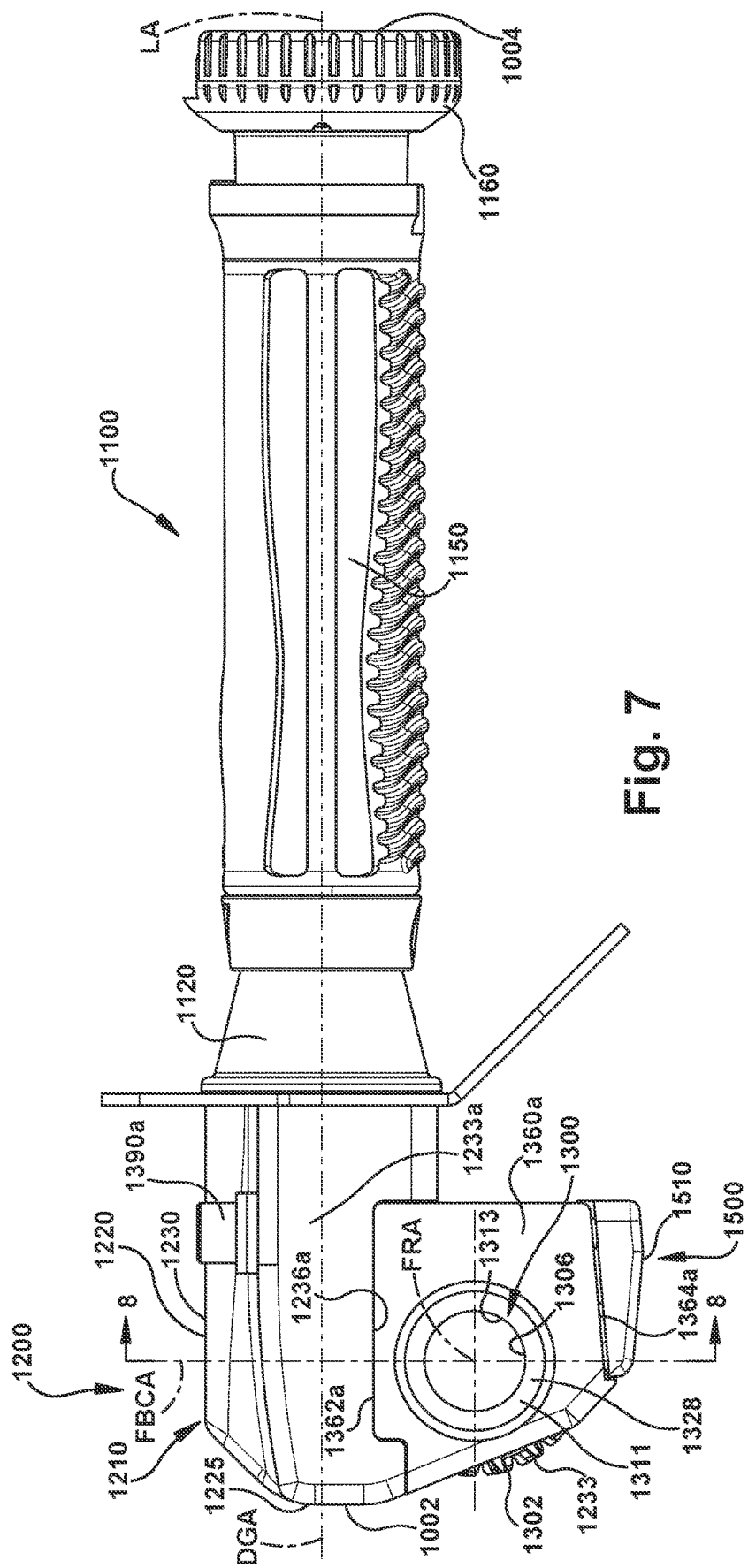
FIG. 7 is a schematic side elevation view of the power operated trimming tool of FIG. 1.
Figure 8:
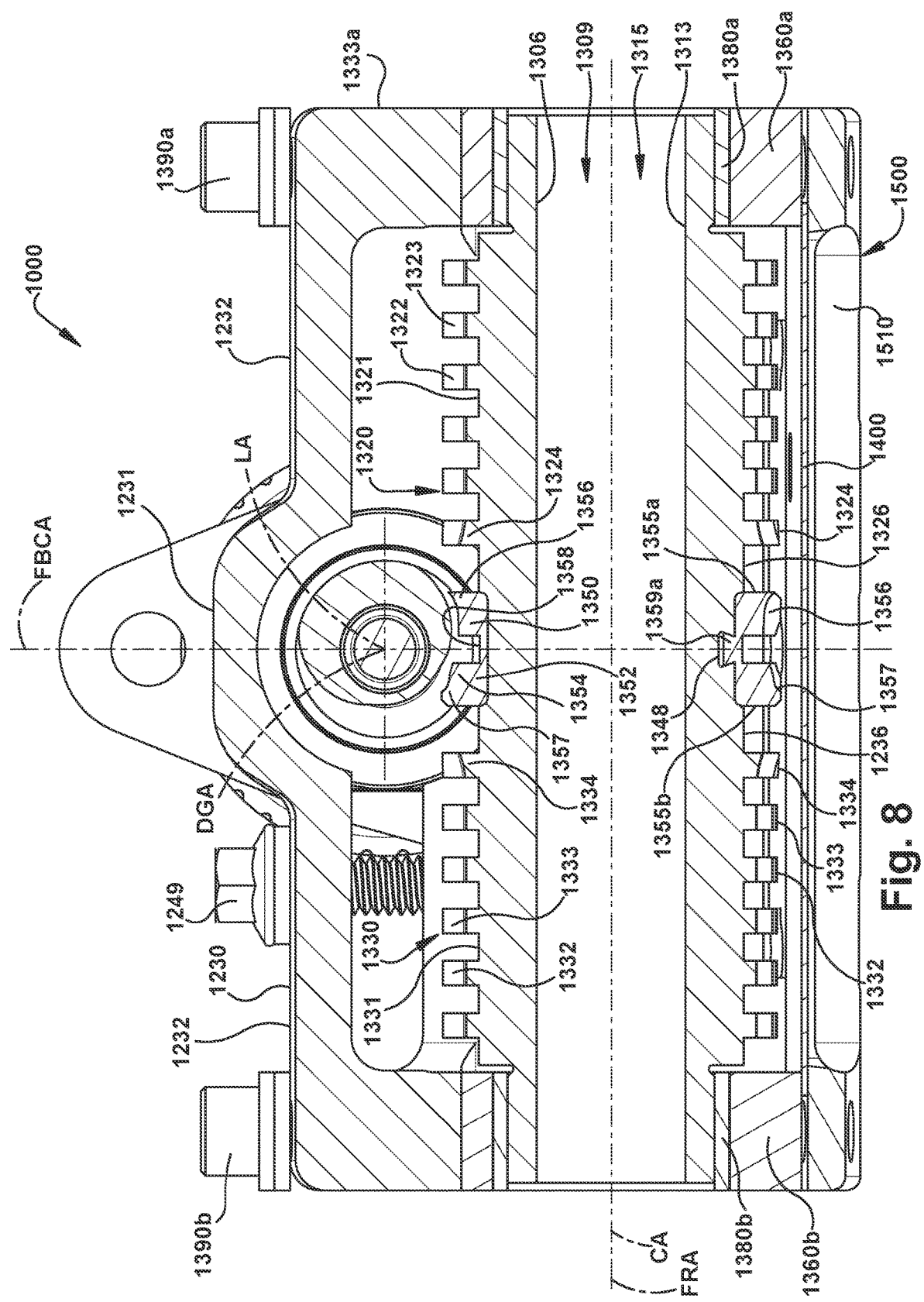
FIG. 8 is a schematic vertical section view of the head assembly of the power operated trimming tool of FIG. 1, as seen from a plane indicated by the line 8-8 in FIG. 7.

As seen in FIGS. 5-7, the power operated trimming tool 1000 extends between a forward or distal end 1002 and a rearward or proximal end 1004. The power operated trimming tool 1000 includes the elongated handle assembly 1100 extending along a longitudinal axis LA and, as best seen in FIGS. 9 and 10, the head assembly 1200 is coupled to a distal end portion 1106 of the handle assembly 1100. The handle assembly 1100 defines the generally cylindrical through bore 1102 that is centered about the handle assembly longitudinal axis LA and includes a handle body 1110, the handle extension 1120 extending distally from the handle body 1110 and a driver retainer assembly 1160 extending proximally from the handle body 1110. The driver retainer assembly 1160 releasably secures a driver assembly of the flex shaft of the flexible shaft drive transmission within the through bore 1102 of the handle assembly 1100 such that a drive coupling of the flexible shaft drive transmission engages and rotates the drive gear 1602 of the drive mechanism 1600 about the drive gear axis of rotation DGA. A central portion 1114 of the handle body 1110 is generally cylindrical and receives an overlying contoured hand piece or hand grip 1150 that is gripped by the operator to manipulate the power operated trimming tool 1000. The drive gear axis of rotation DGA is substantially aligned with and coincident with the handle assembly longitudinal axis LA, while the feed roll axis of rotation FRA offset from and substantially orthogonal to the drive gear axis of rotation DGA.

As best seen in FIGS. 9 and 10, the handle extension 1120 extends distally in a forward direction F from the handle body 1110 and includes a reduced diameter distal end portion 1122. The reduced diameter end portion 1122 is sized to be snugly received in the interface portion 1212 of the frame body 1210 and, more specifically, to be snugly received in a through bore 1214 defined by the interface portion 1212. As used herein, the forward or distal direction F and the rearward or proximal direction R are as shown, for example, in FIG. 5, while the upward direction UP and the downward direction DW are as shown, for example, in FIG. 4. The forward direction F is a direction along or parallel to the handle assembly longitudinal axis LA toward the distal end 1002 of the power operated trimming tool 1000, while the rearward direction R is opposite the forward direction F. The upward direction UP is along or parallel to a frame body central axis FBCA in a direction toward the upper wall 1230 of the support portion 1220 of the frame body 1210, while the downward direction DW is opposite the upward direction UP. As noted above, the inner surface 1130 of the handle extension 1120 defines the forward portion 1104 of the handle assembly through bore 1102.

The distal section 1132 of the inner surface 1130 of the handle extension 1120 defines the bearing seating region 1134 which receives and supports the shaft support assembly 1680. In one exemplary embodiment, the shaft support assembly 1680 includes the first distal bearing support assembly 1682 and the second proximal bearing support assembly 1684. The longitudinally spaced first and second bearing support assemblies 1682, 1684 are received in the bearing seating region 1134 of the handle extension 1120. As can best be seen in FIG. 10, the inner surface 1130 of the handle extension 1120 also includes an annular groove 1136 adjacent the bearing seating region 1134 that receives a retaining ring 1690 of the shaft support assembly 1680 to maintain the first and second bearing support assemblies 1682, 1684 in place. The longitudinally spaced bearing supports of the drive gear 1602 provided by the first and second bearing support assemblies 1682, 1684 bear against and support a central, cylindrical body 1611 of the intermediate shaft 1610. As can best be seen in FIGS. 9 and 10, the bearing two longitudinally spaced apart bearing support assemblies 1682, 1684 are advantageously are located about a longitudinal center point of the drive gear 1602 to provide for additional stability in the bearing support afforded by the assemblies 1682, 1684. The first and second bearing supports assemblies 1682, 1684 provide for improved rotational support of the drive gear 1602, less chatter and/or undesirable radial movement of the drive gear 1602 under certain load conditions, as opposed to using a single bearing support means. Chatter and undesirable radial movement of the drive gear 1602 would be typically experienced by the operator as undesirable vibration of the trimming tool 1000, premature component wear, and/or excessive heating of components.

In one exemplary embodiment, the first and second bearing support assemblies 1682, 1684 are ball bearing support assemblies. In lieu of ball bearing support assemblies, as would be recognized by one of skill in the art, sleeve bushings may be utilized. When the flexible shaft drive transmission is operatively coupled between the motor and the drive mechanism 1600 of the power operated trimming tool 1000, the handle assembly longitudinal axis LA, the flexible shaft drive transmission central longitudinal axis and the drive gear axis of rotation DGA are substantially aligned and coincident in a region of the handle assembly 1100, while the feed roll axis of rotation FRA is offset vertically from the handle assembly longitudinal axis as measured along the frame body central axis FBCA and is substantially orthogonal to the handle assembly longitudinal axis LA. The frame body central axis FBCA (shown schematically in FIGS. 5-7) is centered between and extends generally vertically and parallel to first and second side walls 1233*a*, 1233*b* of the frame body 1210 and generally orthogonal to and intersects the feed roll axis of rotation FRA and is generally orthogonal to and intersects the handle assembly longitudinal axis LA.

Head Assembly 1200 and Frame Body 1210

As seen in FIGS. 1-11, the head assembly 1200 of the power operated trimming tool 1000 extends from the distal end portion 1106 of the handle assembly 1100 and includes the generally box-like frame body 1210 including the interface portion 1212, that is coupled to the handle extension 1120 of the handle assembly 1100 to secure the head assembly 1200 to the handle assembly 1100, and the support portion 1220, that supports the feed roll assembly 1300, the stationary blade 1400 and the blade retainer assembly 1500. The frame body 1210 includes an upper wall 1230 bridging spaced apart the first and second truncated side walls 1233*a*, 1233*b*, a front wall 1225 extending from the upper wall 1230 and contiguous with the side walls 1233*a*, 1233*b* and a back or rear wall 1245 extending from the upper wall 1230 and extending downwardly slightly below the first and second side walls 1233a, 1233b.

The interface portion 1212 of the frame body 1210 includes a through bore 1214 formed in the back wall 1245 which receives an end portion 1122 of the handle extension 1120 of the handle assembly 1100. The handle extension end portion 1122 is secured to the interface portion 1212 of the frame body 1210 via a bolt 1249 that is threaded into a threaded insert 1250 (FIG. 3) disposed in openings extending through a horizontally split portion of the back wall 1245 (best seen in FIG. 8) offset from the through bore 1214 of the interface portion 1212. As the bolt 1249 is tightened, the circumference of the through bore 1214 is reduced thereby securing the handle extension end portion 1122 within the through bore 1214 and thereby affixing the handle assembly 1100 to the head assembly frame body 1210. The threaded insert is provided to mitigate the possibility of the bolt pulling out of the frame 1210 as the bolt 1249 is tightened. The upper wall 1230 of the frame body 1210 includes a domed central portion 1231 that provides clearance in the support portion interior region 1222 for the worm gear driver 1620 of the drive gear 1602 of the drive mechanism 1600. Adjacent and extending from the domed central portion 1231 of the upper wall 1230 are two vertically lower horizontally or laterally extending flanking portions 1232.

Figure 11:
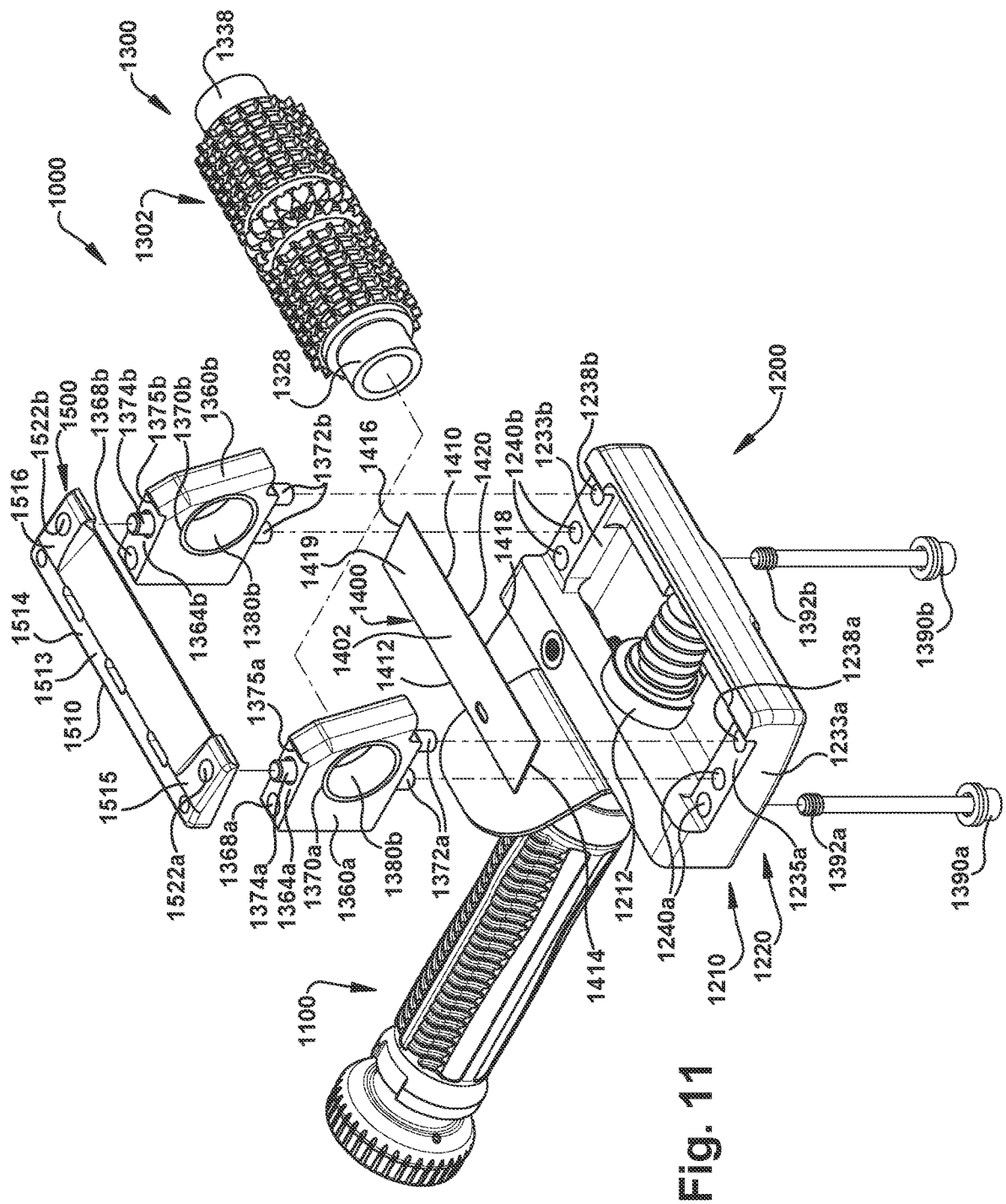
FIG. 11 is a schematic partially exploded, bottom, front perspective view of the power operated trimming tool of FIG. 1.
Figure 30:
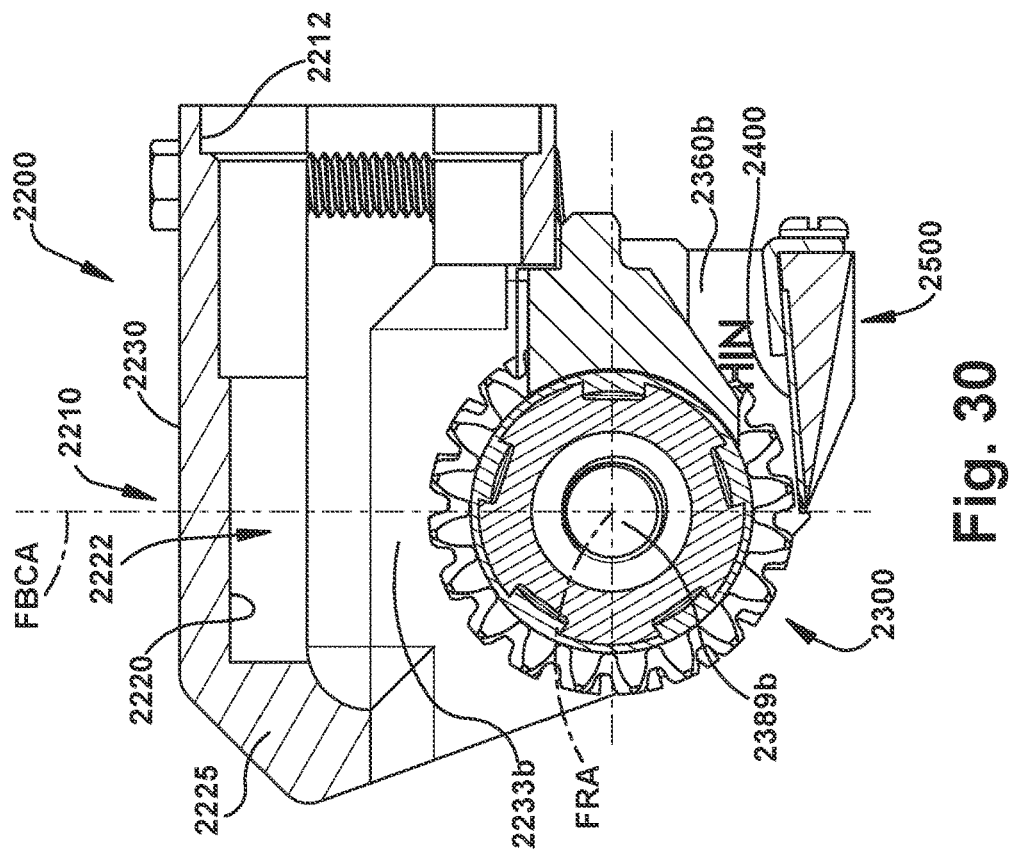
FIG. 30 is a schematic longitudinal vertical section view of the head assembly of FIG. 25.
Figure 29:
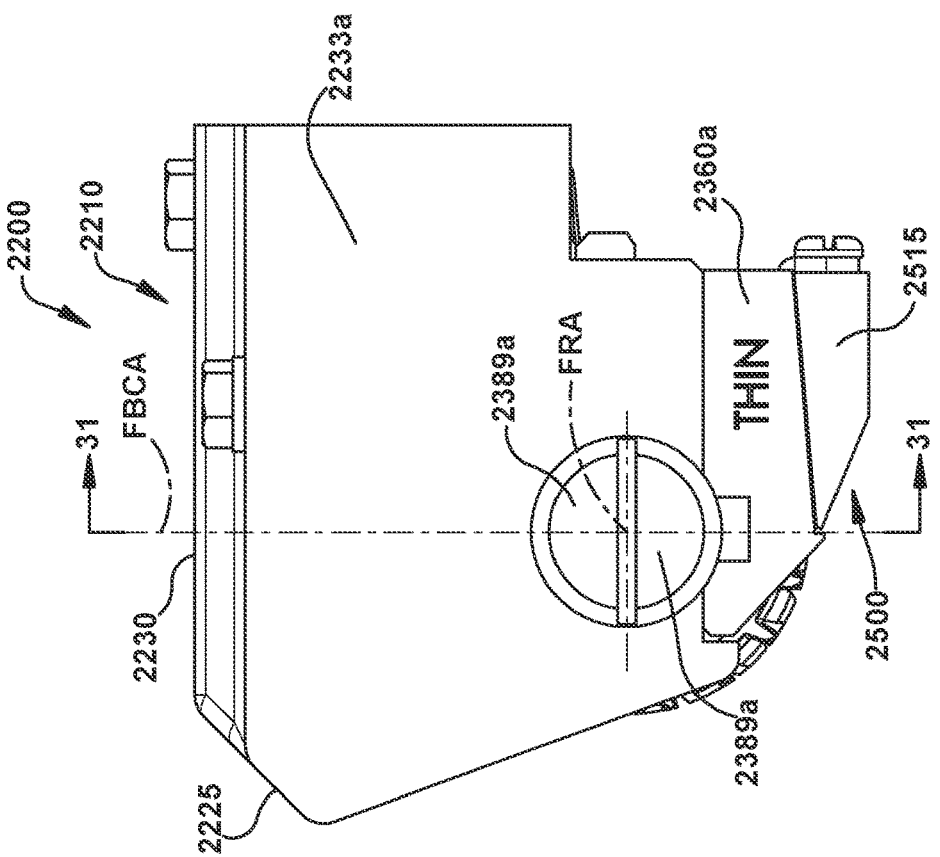
FIG. 29 is a schematic side elevation view of the head assembly of FIG. 25.

Located below the back wall 1245 of the frame body 1210 is a back opening where trimmed tissue severed from a workpiece by a cutting edge 1420 along a forward side 1410 of the stationary blade 1400 exits the head assembly 1200. As best seen in FIG. 11, each of the side walls 1233a, 1233b includes a lower or downward facing surface 1235a, 1235b that includes an upwardly extending recess or cavity 1236a, 1236b. The respective cavities 1236a, 1236b are sized to snugly receive projecting upper surfaces 1362a, 1362b of first and second side plates 1360a, 1360b which are part of the feed roll assembly 1300. The first and second side plates 1360a, 1360b of the feed roll assembly 1300 and a blade retainer plate 1510 of the blade retainer assembly 1500 are secured to the side walls 1233a, 1233b of the frame body 1210 by a pair of threaded fasteners or connectors 1390a, 1390b. The pair of threaded fasteners 1390a, 1390b secure the side plates 1360a, 1360b and the blade retainer plate 1510 to the side walls 1233a, 1233b of the frame body 1210, specifically, the pair of fasteners 1390a, 1390b: a) extend through aligned vertical threaded openings 1238a, 1238b of the side walls 1233a, 1233b of the frame body 1210; b) extend through aligned vertical threaded through bores 1368a, 1368b of the side plates 1360a, 1360b; and c) threaded end portions 1392a, 1392b of the threaded fasteners 1390a, 1390b thread into respective threaded vertical openings 1520a, 1520b in side projections 1515, 1516 of the blade retainer plate 1510 to secure the blade retainer plate 1510 and the side plates 1360a, 1360b to the side walls 1233a, 1233b of the frame body 1210. The side plates 1360a, 1360b, in turn, support first and second sleeve bushings 1380a, 13980b that rotatably support the outer diameter of the feed roll 1302. The blade retainer plate 1510, in turn, supports the stationary blade 1400 on an upper blade support surface 1512 of the blade retainer plate 1510. The lower surfaces 1235a, 1235b of the side walls 1233a, 1233b also each include a pair of blind holes 1240a, 1240b that received respective corresponding pairs of upwardly projecting locating pins 1372a, 1372b extending from the upper surfaces 1362a, 1362b of the side plates 1360a, 1360b to properly orient and locate the side plates 1360a, 1360b with respect to the frame body side walls 1233a, 1233b.

Feed Roll Assembly 1300

As mentioned previously, the feed roll assembly 1300 is part of the head assembly 1200 and is supported with the interior region 1222 of the frame body 1210. The feed roll assembly 1300 of the present disclosure includes the one-piece feed roll 1302, the side plates 1360a, 1360b, and the pair of threaded fasteners 1390a, 1390b which secure the side plates 1360a, 1360b and the blade retainer plate 1510 to the side walls 1233a, 1233b of the frame body 1210. The feed roll assembly 1300 also includes the pair of sleeve bushings 1380a, 1380b supported in respective horizontal openings 1370a, 1370b of the side plates 1360a, 1360b. The pair of sleeve bushings 1380a, 1380a support the feed roll 1302 by supporting and bearing against an outer diameter (OD) defined by the outer surface 1308 of the feed roll 1312. In addition to supporting the feed roll 1302, the side plates 1360a, 1360b also facilitate support of the stationary blade 1400. Each of the lower surfaces 1364a, 1364b of the sides plates 1360a, 1360b provide a seating surface for first and second side projections 1515, 1516 of the blade retainer plate 1510 and each of the lower surfaces 1364a, 1364b includes a downwardly projecting pin or post 1374a, 1374b that is received in respective vertical opening 1522a, 1522b of first and second side projections 1515, 1516 of the blade retainer plate 1510 to properly orient and locate the blade retainer plate 1510 with respect to the side plates 1360a, 1360b. Further, forward downwardly stepped portions 1375a, 1375b of each of the lower surfaces 1364a, 1364b of the side plates 1360a, 1360b advantageously constrain the blade 1400 from forward movement with respect to the blade retainer plate 1510.

As best seen in FIGS. 11-19, the one-piece, power driven feed roll 1302 of the present disclosure is generally cylindrical and includes the first end 1304 and the longitudinally spaced apart second end 1305 and the inner surface 1306 and the radially spaced apart second surface 1308. The inner surface 1306 defines a longitudinal through bore 1315 which is centered about a central longitudinal axis CA of the feed roll 1302. The central axis CA of the feed roll 1302 is coincident with the feed roll axis of rotation FRA. The feed roll 1302 comprises the cylindrical core 1310 (FIG. 17) and the integral, cast annular drive gear 1350 which is disposed in the central recess or annular slot 1342 of the central portion 1340 of the outer surface 1314 of the cylindrical core 1310. In one exemplary embodiment, the annular drive gear 1350 comprises the worm gear 1352 which is driven, as described above, by the gearing engagement of the worm gear driver 1620 of the drive gear 1602 of the drive mechanism 1600.

The cylindrical core 1310 includes a first end 1311, corresponding to the first end 1304 of the feed roll 1302, and a longitudinally spaced apart second end 1312, corresponding to the second end 1305 of the feed roll 1302, and an inner surface 1313, corresponding to the inner surface 1306 of the feed roll 1302, and the outer surface 1314, corresponding to a portion of the outer surface 1308 of the feed roll 1302. The inner surface 1313 of the cylindrical core 1310 defines a longitudinal through bore 1315 extending along and centered about the feed roll central axis CA, corresponding to the through bore 1309 of the feed roll 1302.

The outer surface 1314 of the cylindrical core 1310 includes a first flanking portion 1320 and a second flanking portion 1330, longitudinally spaced apart by the central portion 1340. By "longitudinally spaced" with respect to descriptions of the feed roll 1302, it is meant spaced apart as viewed along or with respect to the central axis CA or feed roll axis of rotation FRA. The annular drive member or annular drive gear 1350 is disposed or located in the central portion 1340. The first flanking portion 1320 of the outer surface 1314 of the cylindrical core 1310 includes a central region 1321 including the plurality of sets of circumferential drive teeth 1322. Each of the sets of drive teeth 1322 includes a plurality of circumferentially space apart, radially outwardly extending, generally triangular shaped drive teeth 1323 that dig the outer surface of the workpiece and, upon rotation of the feed roll 1302 about the feed roll axis of rotation FRA, advances the outer layer of tissue toward the cutting edge 1420 of the stationary blade 1400 for trimming the outer layer of skin or tissue from the workpiece, as previously described. The each of the plurality of drive teeth 1323 have a generally spiked rectangular shape to facilitate engaging and penetrating the outer surface of the workpiece such that, as the feed roll 1302 rotates, the workpiece is firmly urged or pushed against the cutting edge 1420 of the blade 1400. Between each adjacent pair of sets of drive teeth of the plurality of sets of drive teeth 1322 is an annular or circumferential gap 1325 to provide for cleaning of debris from the drive teeth 1323 by a plurality of stationary combs (not shown) projecting into each of the annular gaps 1325. Each of the drive teeth 1323 includes an inner surface and an outer surface, the outer surface defining an overall outer diameter of the cylindrical core 1310.

In addition to the central region 1321 of the first flanking portion 1320 of the outer surface 1314 of the cylindrical core 1310, the first flanking portion 1320 further includes a recessed cylindrical inner region 1326 extending between an innermost set of drive teeth 1324 of the plurality of sets of drive teeth 1322 and a first radially extending side wall 1345 of the cylindrical recess 1342 of the central portion 1340 of the outer surface 1314. The purpose of the recessed cylindrical region 1326 is to advantageously provide sufficient clearance (shown as longitudinal distance d in FIG. 18) for the machining operations that form the drive teeth 1323 when the casting of the annular drive gear 1350 onto the cylindrical recess or annular slot 1342 of the cylindrical core 1310 has already occurred. For example, see FIGS. 18 & 19 schematically depicting intermediate steps in the fabrication of the sets of drive teeth 1322 and the annular drive gear 1350 of the feed roll 1302. Adjacent the first end 1311 of the cylindrical core 1310, the first flanking portion 1320 includes a reduced diameter bearing support outer region 1328 which is received in the sleeve bushing 1380a of the first side plate 1360a.

The second flanking portion 1330 of the outer surface 1314 of the cylindrical core 1310 is a mirror image of the first flanking portion 1320 and includes a central region 1331 including the plurality of sets of circumferential drive teeth 1332. Each of the sets of drive teeth 1332 includes a plurality of circumferentially space apart, radially projecting, generally triangular shaped drive teeth 1333. Between each adjacent pair of sets of drive teeth of the plurality of sets of drive teeth 1332 is an annular or circumferential gap 1335 to provide for cleaning of debris from the drive teeth 1333 by a plurality of stationary combs (not shown) projecting into each of the annular gaps 1325. The second flanking portion 1330 further includes a recessed cylindrical inner region 1336 extending between an innermost set of drive teeth 1334 of the plurality of sets of drive teeth 1332 and a second radially extending side wall 1346 of the cylindrical recess 1342 of the central portion 1340 of the outer surface 1314. The purpose of the recessed cylindrical region 1336 is to advantageously provide sufficient clearance (shown as longitudinal distance d in FIG. 18) for the machining operations that form the drive teeth 1333 when the casting of the annular drive gear 1350 onto the cylindrical recess or annular slot 1342 of the cylindrical core 1310 has already occurred. For example, see FIGS. 18 & 19 schematically depicting intermediate steps in the fabrication of the sets of drive teeth 1332 and the annular drive gear 1350 of the feed roll 1302. Adjacent the second end 1312 of the cylindrical core 1310, the second flanking portion 1330 includes a reduced diameter bearing support outer region 1338 which is received in the internal bushing 1380b of the second side plate 1360b. As noted previously, the feed roll 1302 is supported for rotation about the feed roll axis of rotation FRA by the sleeve bushings 1380a, 1380b, specifically, the bearing support outer regions 1328, 1338 of the first and second flanking portions 1320, 1330 are supported for rotation by sleeve bushings 1380a, 1380b.

The central portion 1340 of the outer surface 1314 of the cylindrical core 1310 includes the cylindrical recess or annular slot 1342, which is recessed radially inwardly as compared to the first and second flanking portions 1320, 1330. When viewed in longitudinal cross section (FIG. 15), the cylindrical recess 1342 includes a base or bottom wall 1344 and the first and second radially extending side wall 1345, 1346 extending from opposite ends of the bottom wall 1344. In one exemplary embodiment, the base 1344 includes a plurality of circumferentially spaced indentations 1348 which advantageously receive radially inwardly extending projections 1359a of an inner surface 1359 of the worm gear 1352 during the casting process for increased strength and rigidity of the worm gear 1352. The annular drive gear or drive member 1350 is cast onto the cylindrical recess 1342, as schematically depicted in FIG. 18, and then machined to form the desired drive gear configuration. In one exemplary embodiment, the annular drive gear 1350 comprises the worm gear 1352 wherein the gear teeth 1354 of the worm gear 1352 have a spur gear configuration. The worm gear 1352 of the annular drive gear 1350 is formed over the cylindrical recess 1342 of the central portion 1340 and is integral with the cylindrical core 1310, the worm gear 1352 includes side walls 1355a, 1355b that respectively extend along the first and second radially extending side walls 1345, 1346 of cylindrical recess 1342 and protrude radially outwardly beyond the recessed cylindrical inner regions 1326, 1336 of the first and second flanking portions 1320, 1330 adjacent the cylindrical recess 1342. An outer surface 1353 of the worm gear 1352 includes the plurality of circumferentially spaced gear teeth 1354, each of the gear teeth 1354 including an outer surface or top land 1354a, which defines the overall outer diameter DIA (FIG. 15) of the feed roll 1302, and an inner surface or bottom land 1354b. In one exemplary embodiment, the set of gear teeth 1354 includes an annular central gap 1358 which divides the gear teeth into first and second sections 1356, 1357, spaced longitudinally apart. The central gap 1358 advantageously provides for a comb (not shown) projecting into the gap 1358 for the purpose of cleaning debris from the worm gear 1352.

Blade 1400 and Blade Retainer Assembly 1500

The stationary blade 1400 (best seen in FIG. 11) includes a generally rectangular body 1402, including the forward side 1410, the back side 1412 and first and second lateral sides 1414, 1416 and generally planar upper and slower surfaces 1418, 1419. The forward side 1410 includes the cutting edge 1420 of the blade 1400. The blade 1400 is precisely positioned with respect to the feed roll 1302 by a combination of the side plates 1360a, 1360b and the threaded fasteners 1390*a*, 1390*b* and by the blade retainer plate 1510. The blade retainer plate 1510 position the blade 1400 such that the forward cutting edge 1420 of the fixed blade 1400 is positioned with respect to the rotating feed roll 1302, thereby determining a cutting depth of the power operated trimming tool 1000. The cutting edge 1420 of the blade 1400 is in proximity to the outer surface 1308 of the feed roll 1302. The cutting depth of the trimming tool 1000 being determined by a radial distance between the outer surface 1308 of the feed roll 1302 and the cutting edge 1420 of the blade 1400. As the operator moves the power operated trimming tool 1000 along an outer surface of a workpiece, rotation of the feed roll 1302 and the engagement of projecting annular sets of drive teeth 1322, 1332 of the feed roll 1302 with the workpiece urges the workpiece into contact with the cutting edge 1420 of the blade 1400 such that a desired outer layer of the workpiece is trimmed or severed from the workpiece, at the desired cutting depth.

The blade retainer assembly 1500 includes the blade retainer plate 1510 and the pair of threaded fasteners or connectors 1390*a*, 1390*b*, which are shared with the feed roll assembly 1300. The pair of threaded fasteners 1390*a*, 1390*b* secure the side plates 1360*a*, 1360*b* and the blade retainer plate 1510 to the side walls 1233*a*, 1233*b* of the frame body 1210 and are thus part of both the blade retainer assembly 1500 and the feed roll assembly 1300. As best seen in FIGS. 11 and 20-23, the blade retainer plate 1510 includes a thicker back or proximal base 1514 and a pair of forwardly extending side projections 1515, 1516 extending from opposite ends of the base 1514. Bridging the side projections 1515, 1516 is a thinner central portion 1517. The blade retainer plate 1510 includes a generally planar upper surface 1512 and a lower surface 1513. In the region of the thinner central portion 1517, the upper surface 1512 defines a planar blade support surface 1512*a*. Extending upwardly from a general extent of the upper surface 1512 in the region of the base 1514 is a blade retainer stop 1518 which seats or provides a stop for the back side 1412 of the blade 1400 and prevents rearward movement of the blade 1400. Advantageously, the blade retainer stop 1518 includes three overhanging retainer tabs 1518*a* which bear against the upper surface 1418 of the blade 1400 adjacent the back side 1412 to further seat the blade 1400 and inhibit movement of the blade 1400 with respect to the blade retainer plate 1410. The central portion 1517 of the blade retainer plate 1510 advantageously supports the blade 1400 along the entirety of its lateral extent between the first and second lateral sides 1414, 1416 of the blade 1400 thereby mitigating deflection of the blade when large cutting forces are applied to the blade during cutting and trimming operations.

The first and second side projections 1515, 1516 of the blade retainer plate 1510 include the respective threaded vertical openings 1520*a*, 1520*b* that receive the threaded ends 1392*a*, 1392*b* of the pair of fasteners 1390*a*, 1390*b* such that, when tightened, the fasteners 1390*a*, 1390*b* secure the blade retainer plate 1510 and the side plates 1360*a*, 1360*b* to the side walls 1233*a*, 1233*b* of the frame body 1210. Additionally, the first and second side projections 1515, 1516 of the blade retainer plate 1510 include the respective non-threaded vertical openings 1522*a*, 1522*b*. As noted above, the openings 1522*a*, 1522*b* receive respective downwardly projecting locating posts or pins 1374*a*, 1374*b* extending from the lower surfaces 1364*a*, 1364*b* of the side plates 1360*a*, 1360*b* to properly orient and locate the blade retainer plate 1510 with respect to the side plates 1360*a*, 1360*b*.

In one exemplary embodiment, the outer diameter DIA is approximately 1.44 in. and a length of the feed roll 1302 between first and second ends 1304, 1305 is approximately 4.42 in. In one exemplary embodiment, the feed roll 1302 is driven at a rotational speed of approximately 450 revolutions per minute and a minimum gap between the upper surface 1418 of the blade 1400 and the extending outer surface 1308 of the feed roll 1302 is approximately 0.12 in. As would be understood by one of skill in the art, the foregoing dimensions and rotational speeds may vary depending on the characteristics of the workpiece, the desired trimming operations to be performed and other factors.

In one exemplary embodiment, the handle assembly 1100 may be fabricated of plastic or other material or materials known to have comparable properties and may be formed by molding and/or machining. The frame body 1210 may be fabricated of aluminum or stainless steel or other material or materials known to have comparable properties and may be formed/shaped by casting and/or machining. The knife blade 1300, the blade retainer assembly 1500, and the drive mechanism 1600 may be fabricated of a hardenable grade of alloy steel or a hardenable grade of stainless steel, or other material or materials known to have comparable properties and may be formed/shaped by machining, forming, casting, forging, extrusion, metal injection molding, additive manufacturing and/or electrical discharge machining or another suitable process or combination of processes. The cylindrical core 1310 of the feed roll 1302 may be fabricated from an alloy steel, in one exemplary embodiment, a stainless steel alloy, for example 17-4 PH grade stainless steel, and the annular drive gear 1350 may be bronze, which is cast over the cylindrical recess 1342 of the cylindrical core 1310 and then subsequently machined to form the desired configuration of the worm gear 1352.

Second Exemplary Embodiment—Head Assembly 2200

A second exemplary embodiment of a head assembly of the present disclosure is schematically depicted generally at 2200 in FIGS. 25-32. The head assembly 2200 is adapted to be used in a power operated trimming tool, similar to the power operated trimming tool 1000 of the first exemplary embodiment. The handle assembly (not shown) and drive mechanism (not shown) to be used in connection with the head assembly 2200 of the second exemplary embodiment would be similar to the handle assembly 1100 of the power operated trimming tool 1000 of the first exemplary embodiment. Like the head assembly 1200 of the first exemplary, the head assembly 2200 includes a frame body 2210, a feed roll assembly 2300, including a power-driven, one-piece, integral feed roll 2302, and a blade retainer assembly 2500 including a blade retainer plate 2510 supporting a stationary blade 2400. The blade 2400 of the second exemplary embodiment is substantially identical to the stationary blade 1400 of the first exemplary embodiment. For brevity, the head assembly 2200 of the second exemplary embodiment will be generally described in view of differences with respect to the head assembly 1200 of the first exemplary embodiment, with the understanding that the features and advantages of the head assembly 1200 of the first exemplary embodiment are shared by the head assembly 2200 of the second exemplary embodiment and, specifically, that the features and advantages of the feed roll 1302 of the first exemplary embodiment are shared by the feed roll 2302 of the second exemplary embodiment. The description of the power operated trimming tool 1000, including the head assembly 1200, of the first exemplary embodiment is incorporated herein in its entirety by reference.

Because of the strength and rigidity afforded by the metal alloy construction and casting process used in the fabrication of the power-driven, one-piece feed rolls 1302, 2302 of the present disclosure, there is no need to support the feed rolls 1302, 2302 on a feed roll shaft, as mentioned previously. Thus, the feed rolls 1302 are cylindrical and include central through bores 1309, 2309. This advantageously provides that the feed rolls 1302, 2302 have a configuration that allows for support of the feed roll for rotation about the feed roll axis of rotation FRA by bearing support of an outer diameter (OD) of the feed rolls 1302, 2302 adjacent respective opposite ends 1304, 1305, 2304, 2305 of the feed rolls 1302, 2302 or by bearing support of an inner diameter (ID) of the feed rolls 1302, 2302 adjacent respective opposite ends 1304, 1305, 2304, 2305 of the feed rolls 1302, 2302. This provides flexibility of using the feed rolls 1302, 2302 of the present disclosure in a variety of head assemblies, some of which may require the feed roll to be supported via ID support and others which may require the feed roll to be supported via OD support.

As best seen in FIGS. 32-37, the feed roll assembly 2300 of the second exemplary embodiment includes the power-driven, one-piece, integral feed roll 2302 which is rotatatably driven about a feed roll axis of rotation FRA. One of the differences between the feed roll 1302 of the first exemplary embodiment and the feed roll 2302 of the second exemplary embodiment is that that feed roll 2302 is that the feed roll 2302 is supported for rotation about the axis of rotation FRA by ID bearing support (FIG. 31), as opposed to OD bearing support, as was the case with the feed roll 1302 (FIG. 8) of the first exemplary embodiment. Specifically, the feed roll 2302 of the second exemplary embodiment includes a cylindrical core 2310 and an integral annular drive gear 2350 formed on the cylindrical core 2310. The cylindrical core 2310 includes an inner surface 2313, corresponding to an inner surface 2306 of the feed roll 2302, and a radially spaced apart outer surface 2314, corresponding to a portion of the outer surface 2308, and a first end 2311, corresponding to a first end 2304 of the feed roll 2302, and a longitudinally spaced apart spaced apart second end 2312, corresponding to a second end 2305 of the feed roll 2302. As with the feed roll 1302 of the first exemplary embodiment, the annular drive gear 2350 of the feed roll 2302 is formed by casting the drive gear 2350 over the outer surface 2314 of the cylindrical core 2310 and, more specifically, by forming the drive gear 2350 over a cylindrical recess 2342 of a central portion 2340 of the cylindrical core outer surface 2314.

Figure 31:
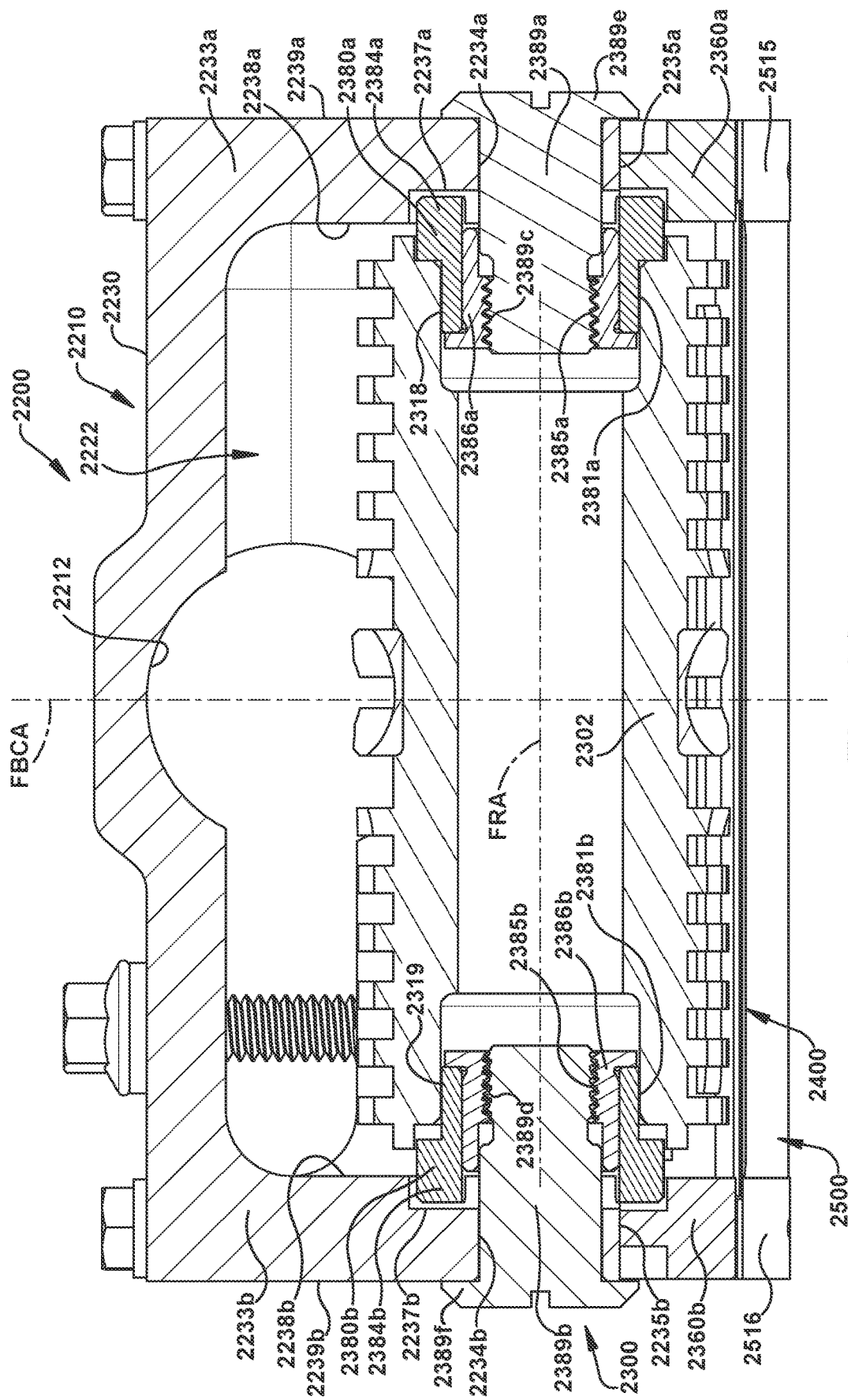
FIG. 31 is a schematic vertical section view of the head assembly of FIG. 25, as seen from a plane indicated by the line 31-31 in FIG. 29.
Figure 32:
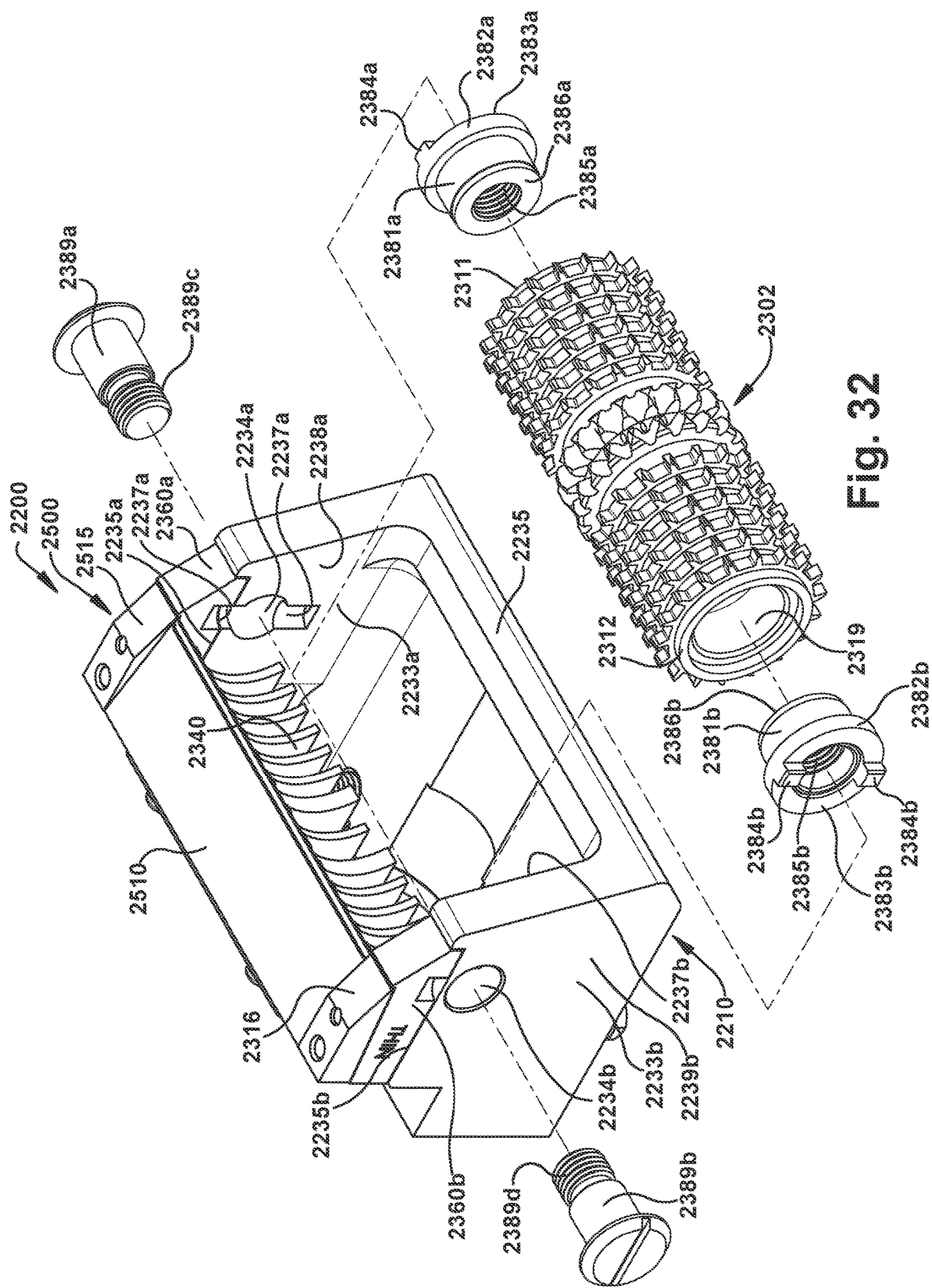
FIG. 32 is a schematic partially exploded, bottom, front perspective view of the head assembly of FIG. 25.

As best seen in FIGS. 31 and 32, first and second bearing support regions 2318, 2319 of the feed roll 2302 are disposed on the inner surface 2313 of the cylindrical core 2310 adjacent the respective first and second ends 2311, 2312 of the cylindrical core 2310. Advantageously, the feed roll bearing support regions 2318, 2319 are rotatably supported by inwardly projecting cylindrical bearing regions 2381a, 2381b of first and second stubshaft bushings 2380a, 2380b of the feed roll assembly 2300. The first and second stubshaft bushings 2380a, 2380b are secured to the first and second side walls 2333a, 2233b by first and second threaded bushing retainers 2389a, 2389b which extend through respective horizontal openings 2234a, 2234b in first and second side walls 2233a, 2233b of the frame body 2310 (FIG. 31). In the feed roll of the first exemplary embodiment, the cylindrical outer diameter bearing support regions 1328, 1338 were supported for rotation by the pair of sleeve bushings 1380a, 1380b disposed in horizontal openings 1370a, 1370b of side plates 1360a, 1360b of the feed roll assembly 1300. By contrast, the feed roll 2302 of the second exemplary embodiment is supported for rotation by bearing support on an inner diameter (ID) of the feed roll 2302. Specifically, the feed roll 2302 is supported for rotation about its axis of rotation FRA (which is coincident with a central axis CA of the feed roll 2302) by cylindrical inner diameter bearing support regions 2318, 2319 defined by the inner surface 2313 the cylindrical core 2310 adjacent first and second ends 2311, 2312 of the cylindrical core 2310 (corresponding to the first and second ends 2304, 2305 of the feed roll 2302). Thus, cylindrical inner diameter bearing support regions 2318, 2319 result in ID support of feed roll 1302.

Frame Body 2210

The frame body 2210, like the frame body 1210 of the first exemplary embodiment includes a box-like body including an interface portion 2212 and a support portion 2220. The interface portion 2212 (FIG. 28) includes an opening for receiving a distal end portion of a handle extension of the handle assembly, as described with respect to the frame body interface portion 1212 and the handle assembly 1100 of the first exemplary embodiment. The support portion 2220 defines an interior region 2222 that receives and supports the feed roll assembly 2300, as well as portions of the drive mechanism (not shown) extending from the handle extension into the support portion interior region, as explained with respect to frame body 1210 and the frame body interior region 1222 of the first exemplary embodiment.

As best seen in FIGS. 25-32, the frame body 2210 includes an upper wall 2230, and extending downward from the upper wall, the frame body includes: a) a truncated front wall 2225; b) a back or rear wall 2245; and c) the first and second side walls 2233a, 2233b. Unlike the first exemplary embodiment wherein the feed roll assembly 1300 included first and second side plates 1360a, 1360b extending from the lower surfaces 1235a, 1235b of the first and second side walls 1233a, 1233b and supporting the feed roll 1302, in the second exemplary embodiment, the side walls 2233a, 2233b extend further downwardly and have respective horizontally aligned openings 2234a, 2234b. As best seen in FIGS. 31 and 32, the horizontally aligned openings 2234a, 2234b of the side walls 2233a, 2233b receive the first and second stubshaft bushings 2380a, 2380b of the feed roll assembly 2300 which support feed roll 2302 for rotation about the feed roll axis of rotation FRA. Respective lower or bottom surfaces 2235a, 2235b of the side walls 2233a, 2233b of the frame body 2310 provide planar seating surfaces for first and second spacer plates 2360a, 2360b. The first and second spacer plates 2360a, 2360b are sandwiched between the lower surfaces 2235a, 2235b of the frame body side walls 2233a, 2233b and respective first and second side projections 2515, 2516 of the blade retainer plate 2510 of the blade retainer assembly 2500. Advantageously, as the cutting depth of the trimming tool 1000 is determined by a radial distance between the outer surface 2308 of the feed roll 2302 and a cutting edge of the stationary blade 2400, depending on the trimming or cutting operation to be performed, the depth of the head assembly 2200 may be changed by changing the first and second spacer plates 2360a, 2360b to have a larger or smaller thickness or height, wherein thickness or height would be measured along an axis parallel to the frame body central axis FBCA.

Feed Roll Assembly 2300

The feed roll assembly 2300 includes the power-driven, one-piece feed roll 2302, the first and second stubshaft bushings 2380a, 2380b received in the aligned horizontal openings 2234a, 2234b of the frame body side walls 2233a, 2233b, and first and second threaded bushing retainers 2389a, 2389b which secure the first and second stubshaft bushings 2380a, 2380b to the frame body side walls 2233a, 2233b. As best seen in FIGS. 32-37, in one exemplary embodiment, the feed roll 2302 is cylindrical and includes a longitudinally extending, central through bore 2309 centered about the central axis CA of the feed roll 2302 and the feed roll axis of rotation FRA. The feed roll extends longitudinally (that is, as measured along the central axis CA) between the first and second ends 2304, 2305 and extends radially between the inner and outer surfaces 2306, 2308. The feed roll 2302, like the feed roll 1302 of the first exemplary embodiment, is a one-piece, integral structure including the cylindrical core 2310 and the annular drive gear 2350, which is formed by casting over the central portion 2340 of the outer surface 2314 of the cylindrical core 2310 and, specifically, by overcasting the cylindrical recess or annular slot 2342 of the central portion 2340. The cylindrical core 2310, preferably fabricated of stainless steel for strength and corrosion resistance, includes a longitudinally extending, central through bore 2315, corresponding to the feed roll through bore 2309 extending along and centered about the feed roll central axis CA. The cylindrical core includes the first end 2311 and the longitudinally spaced apart second end 2312 and the inner surface 2313 and the radially spaced apart outer surface 2314.

As mentioned previously, increased diameter stepped portions of the through bore 2315 adjacent the first and second ends 2311, 2312 define ID cylindrical bearing regions 2318, 2319. As can best be seen in FIG. 36, the cylindrical bearing regions 2318, 2319 advantageously have a larger diameter than, for example, a smaller diameter central region 2315a of the through bore 2315. Therefore, due to the larger diameter, the bearing regions 2318, 2319 have a greater bearing surface area for receiving the mating cylindrical bearing regions 2381a, 2381b of the respective stubshaft bushings 2380a, 2380b. Larger bearing surfaces areas reduce bearing wear and generated heat. Additionally, a radial thickness of the wall of the cylindrical core 2310 in smaller diameter central region 2315a is increased providing for greater strength and rigidity and reduced flexing or bending of the feed roll 2302 during use than would otherwise be the case if the thickness of the wall of the cylindrical core 2310 were uniform and thinner from the first end 2311 to the second end 2312. The outer surface of the cylindrical core 2310 includes a first flanking portion 2320 and a second flanking portion 2330 separated by the central portion 2340. The first flanking portion 2320 includes a plurality of annular sets of drive teeth 2322, each of the sets comprising a plurality of circumferentially spaced drive teeth 2323. Adjacent sets of the plurality of annular sets of drive teeth 2322 are spaced longitudinally by a circumferential or annular gap 2325, which provide clearance for comb or comb fingers which extend into each of the respective plurality of gaps 2335 (comb fingers are depicted schematically in FIG. 32) for clean debris from the feed roll 2302. The first flanking portion 2320 further includes a reduced diameter inner region 2326 extending between the innermost set of drive teeth 2324 of the first flanking portion 2320 and the annular drive gear 2350. As explained previously with respect to the first flanking portion 1320 of the feed roll 1302 of the first embodiment, the recessed inner region 2326 provides clearance between the sets of drive teeth 2322 and the annular drive gear 2350 to facilitate machining of the drive teeth 2323, obtaining finished diameters for the drive teeth, etc.

Figure 37:
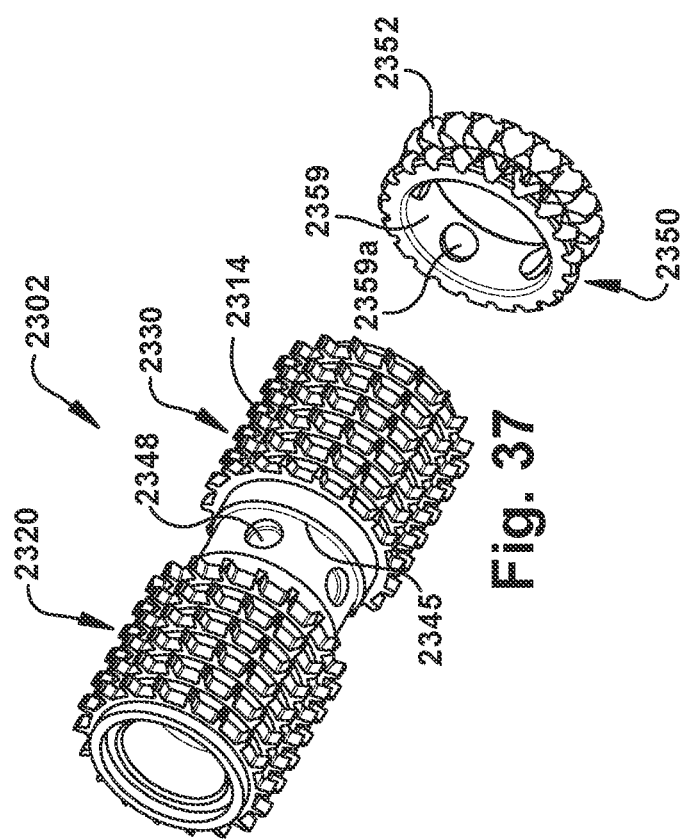
FIG. 37 is a schematic exploded bottom, front perspective view of the feed roll of FIG. 33, showing a cylindrical core of the feed roll and an annular drive member which is integrally cast onto a cylindrical recess of a central portion of an outer surface of the cylindrical core, for illustration purposes, the annular drive member being shown as separated from the cylindrical core.

Similarly, the second flanking portion 2330 of the outer surface 2314 of the cylindrical core 2310 includes a plurality of annular sets of drive teeth 2332, each of the sets comprising a plurality of circumferentially spaced drive teeth 2333. Adjacent sets of the plurality of annular sets of drive teeth 2332 are spaced longitudinally by a circumferential gap 2335, which provide clearance for comb or comb fingers which extend into each of the respective plurality of gaps 2335 (comb fingers are depicted schematically in FIG. 32) for clean debris from the feed roll 2302. The first flanking portion 2320 further includes a reduced diameter inner region 2336 extending between the innermost set of drive teeth 2334 of the second flanking portion 2330 and the annular drive gear 2350. As explained previously with respect to the second flanking portion 1330 of the feed roll 1302 of the first embodiment, the inner region 2336 provides clearance between the sets of drive teeth 2332 and the annular drive gear 2350 to facilitate machining of the drive teeth 2333, obtaining finished diameters for the drive teeth, etc. As best seen in FIG. 36, in one exemplary embodiment, the annular drive gear 2350 is a worm gear 2352 which extends along a base or bottom wall 2344 and first and second radially extending side walls 2345, 2346 of the cylindrical recess 2342 of the central portion 2340 of the outer surface 2314 of the cylindrical core 2310 and extends radially outwardly and above the side walls 2345, 2346 and radially above the adjacent inner regions 2326, 2336 of the first and second flanking portions 2320, 2330. In one exemplary embodiment, as best seen in FIG. 37, the base 2344 of the cylindrical recess 2342 of the outer surface 2314 of the cylindrical core 2310 includes a plurality of circumferentially spaced indentations 2348 which advantageously receive radially inwardly extending projections 2359a of an inner surface 2359 of the worm gear 1352 during the casting process for increased strength and rigidity of the worm gear 1352

In one exemplary embodiment, the first and second stubshaft bushings 2380a, 2380b include the cylindrical bearing regions 2381a, 2381b that are received and provide rotating ID bearing support to the mating inner bearing regions 2318, 2319 of the cylindrical core inner surface 2313 adjacent the first and second ends 2311, 2312 of the cylindrical core. The stubshaft bushings 2380a, 2380b are held in place with respect the inner surfaces 2238a, 2238b (FIG. 31) of the side walls 2233a, 2233b of the frame body 2210 by the first and second threaded connectors 2389a, 2389b of the feed roll assembly 2300. Specifically, in one exemplary embodiment, each of the first and second threaded connectors 2389a, 2389b have threaded distal ends 2389c, 2389d and enlarged heads 2389e, 2389f. The threaded ends 2389c, 2389d of the first and second threaded connectors 2389a, 2389b thread into respective threaded inner openings 2385a, 2386b of inserts 2386a, 2386b of the first and second stubshaft bushings 2380a, 2380b. Each of the first and second threaded connectors 2389a, 2389b also has an enlarged head 2389e, 2389f that bears against respective outer surfaces 2239a, 2239b of the side walls 2233a, 2233b.

As the first and second threaded connectors 2389a, 2389b are tightened, the enlarged heads 2389e, 2389f bear against the outer surfaces 2239a, 2239b of the side walls 2233a, 2233b and the threaded inserts 2386a, 2386b are pulled against respective body portions 2382a, 2382b of the stub shaft bushings 2380a, 2380b to maintain the bushings in place. Advantageously, as best seen in FIG. 32, to prevent the stubshaft bushings 2380a, 2380b from rotating with the driven feed roll 2302, outward facing surfaces 2383a, 2383b of the stubshaft body portions 2382a, 2382b include anti-rotation ribs 2383a, 2383b. The anti-rotation ribs 2383a, 2383b of the stubshaft bushings 2380a, 2380b are received in anti-rotation indents 2237a, 2237b formed in the inner surfaces 2238a, 2238b of the frame body side walls 2233a, 2233b to inhibit rotation of the stubshaft bushings 2380a, 2380b as the feed roll is driven for rotation about the feed roll axis of rotation R.

Annular, as used herein, means generally ring-like or generally ring-shaped in configuration and includes configuration wherein the ring includes or does not include a split extending through a diameter of the ring or annulus. Axially above or axially spaced above, as used herein, means positioned above as viewed with respect to an axis, for example, the frame body central axis FBCA, even if the two elements are not in axial alignment with respect to the axis. Similarly, the terms axially below or axially spaced below, as used herein, means positioned below as viewed with respect to an axis, for example, the frame body central axis FBCA, even if the two elements are not in axial alignment with respect to the axis. Axially extending, as used here, means one element extends from and is positioned above or below a second element with respect to an axis, even if the two elements are not in axial alignment with respect to the axis. Similarly, the terms radially offset from, radially outward of, radially inward of, as used herein, means one element is positioned offset from a second element, as viewed along a radius line extending radially from an axis, the feed roll axis of rotation FRA of the feed roll 1302, even if the two elements are not in radial alignment along the radius line.

As used herein, terms of orientation and/or direction such as front, rear, forward, rearward, distal, proximal, distally, proximally, upper, lower, inward, outward, inwardly, outwardly, upwardly, downwardly, horizontal, horizontally, vertical, vertically, axial, radial, longitudinal, axially, radially, longitudinally, etc., are provided for convenience purposes and relate generally to the orientation shown in the Figures and/or discussed in the Detailed Description. Such orientation/direction terms are not intended to limit the scope of the present disclosure, this application, and/or the invention or inventions described therein, and/or any of the claims appended hereto. Further, as used herein, the terms comprise, comprises, and comprising are taken to specify the presence of stated features, elements, integers, steps or components, but do not preclude the presence or addition of one or more other features, elements, integers, steps or components. The terms "integral" and/or "integrally" as used herein unless defined otherwise means configured in such a way that separation would require destruction to the parts or the assembly of the parts.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings. What have been described above are examples of the present disclosure or invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to, as would be understood by one of ordinary skill in the art. In one non-limiting embodiment the terms are defined to be within for example 10%, in another possible embodiment within 5%, in another possible embodiment within 1%, and in another possible embodiment within 0.5%.

It should be appreciated by those of ordinary skill in the art after having the opportunity of reviewing the drawings and/or specification of the present disclosure that may include one or more embodiments, e.g., $E_1, E_2, \ldots E_n$ and that each embodiment E may have multiple parts $A_1, B_1, C_1 \ldots Z_n$ that (without further description) could be combined with other embodiments $E_n$ parts or lack of parts originally associated with one or all embodiments, or any combination of parts and embodiments thereof. It should further be appreciated that an embodiment may include only one part or a lesser number of parts of any embodiment or combination of embodiments that was described or shown in the specification and/or drawings, respectively without further description than what was disclosed in the original embodiment or combination of embodiments.

The term "coupled" as used herein is defined as connected or in contact either temporarily or permanently, although not necessarily directly and not necessarily mechanically. A device or structure that is "configured" in a certain way is configured in at least that way, but may also be configured in ways that are not listed. To the extent that the materials for any of the foregoing embodiments or components thereof are not specified, it is to be appreciated that suitable materials would be known by one of ordinary skill in the art for the intended purposes after having the benefit of reviewing the subject disclosure and accompanying drawings.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A power-driven feed roll for rotation about a feed roll axis of rotation in a power operated trimming tool, the power-driven feed roll comprising:
   a cylindrical core including a first end and a spaced apart second end and an inner surface and a radially spaced apart outer surface, the inner surface defining a central through bore extending along the feed roll axis of rotation, the outer surface of the cylindrical core including a central portion centered between the first and second ends and including a recess bounded by a base and first and second radially extending side walls at opposite ends of the base, a first flanking portion extending between the first end and the central portion and a second flanking portion extending between the second end and central portion; and
   a drive gear formed over the recess of the central portion and integral with the cylindrical core, the drive gear extending along the first and second radially extending side walls of cylindrical recess and protruding radially outwardly, the first flanking portion including a first plurality of annular sets of drive teeth, each of the first plurality of annular sets of drive teeth including a plurality of circumferentially spaced apart drive teeth, the second flanking portion including a second plurality of annular sets of drive teeth, each of the second plurality of annular sets of drive teeth including a plurality of circumferentially spaced apart drive teeth.

2. The power-driven feed roll of claim 1 wherein the drive gear is an annular drive gear comprising a worm gear.

3. The power-driven feed roll of claim 1 wherein each adjacent pair of the first plurality of annular sets of drive teeth of the first flanking portion are spaced apart by an annular gap and each adjacent pair of the second plurality of annular sets of drive teeth of the second flanking portion are spaced apart by an annular gap.

4. The power-driven feed roll of claim 1 wherein the drive gear protrudes radially outwardly with respect to an interior region of the first flanking portion adjacent the first radially extending wall and protrudes radially outwardly with respect to an interior region of the second flanking portion adjacent the second radially extending wall.

5. The power-driven feed roll of claim 1 wherein the drive gear is formed integrally with the cylindrical core by casting.

6. The power-driven feed roll of claim 1 wherein the drive gear includes a first section adjacent a first end of the drive gear and a second section adjacent a second end of the drive gear and a gap separating the first and second sections of the drive gear.

7. The power-driven feed roll of claim 1 wherein the recess of the central portion of the cylindrical core is an annular recess and includes a plurality of circumferentially spaced indentations protruding radially inwardly into the base of the recess and further wherein an inner surface of the drive gear includes a plurality circumferentially spaced protruding projections, each of the plurality of circumferentially spaced protruding projections being received in a respective one of the plurality of circumferentially spaced indentations protruding radially inwardly into the base of the recess.

8. A power operated trimming tool comprising:
   an elongated handle assembly including a through bore extending along a longitudinal axis of the handle assembly;
   a drive mechanism;
   a head assembly affixed to the handle extension of the handle assembly, the head assembly including a frame body supporting a feed roll and a blade;
   the feed roll driven about a feed roll axis of rotation by the drive mechanism, the feed roll including:
   a cylindrical core including a first end and a spaced apart second end and an inner surface and a radially spaced apart outer surface, the inner surface defining a central through bore extending along the feed roll axis of rotation, the outer surface of the cylindrical core including a central portion centered between the first and second ends and including a recess bounded by a base and first and second radially extending side walls at opposite ends of the base, a first flanking portion extending between the first end and the central portion and a second flanking portion extending between the second end and central portion; and a drive gear formed over the recess of the central portion and integral with the cylindrical core, the drive gear extending along the first and second radially extending side walls of cylindrical recess and protruding radially outwardly, an outer surface of the drive gear driving the feed roll about the feed roll axis of rotation, the first flanking portion including a first plurality of annular sets of drive teeth, each of the first plurality of annular sets of drive teeth including a plurality of circumferentially spaced apart drive teeth, the second flanking portion including a second plurality of annular sets of drive teeth, each of the second plurality of annular sets of drive teeth including a plurality of circumferentially spaced apart drive teeth.

9. The power operated trimming tool of claim 8 wherein the drive gear of the feed roll is an annular drive gear comprising a worm gear.

10. The power operated trimming tool of claim 8 wherein each adjacent pair of the first plurality of annular sets of drive teeth of the first flanking portion of the feed roll are spaced apart by an annular gap and each adjacent pair of the second plurality of annular sets of drive teeth of the second flanking portion of the feed roll are spaced apart by an annular gap.

11. The power operated trimming tool of claim 8 wherein the drive gear of the feed roll protrudes radially outwardly with respect to an interior region of the first flanking portion adjacent the first radially extending wall and protrudes radially outwardly with respect to an interior region of the second flanking portion adjacent the second radially extending wall.

12. The power operated trimming tool of claim 8 wherein the drive gear of the feed roll is formed integrally with the cylindrical core by casting.

13. The power operated trimming tool of claim 8 wherein the drive gear of the feed roll includes a first section adjacent a first end of the drive gear and a second section adjacent a second end of the drive gear and an annular gap separating the first and second sections of the drive gear.

14. The power operated trimming tool of claim 8 wherein the recess of the central portion of the cylindrical core of the feed roll includes a plurality of circumferentially spaced indentations protruding radially inwardly into the base of the recess and further wherein an inner surface of the drive gear of the fee roll includes a plurality circumferentially spaced protruding projections, each of the plurality of circumferentially spaced protruding projections being received in a respective one of the plurality of circumferentially spaced indentations protruding radially inwardly into the base of the recess.

15. A feed roll driven for rotation about a feed roll axis of rotation in a power operated trimming tool, the feed roll comprising:
   a cylindrical core including a first end and a spaced apart second end and an inner surface and a radially spaced apart outer surface, the inner surface defining a central through bore extending along the feed roll axis of rotation, the outer surface of the cylindrical core including a central portion centered between the first and second ends and including a recess bounded by a base and first and second radially extending side walls at opposite ends of the base, a first flanking portion extending between the first end and the central portion and a second flanking portion extending between the second end and central portion; and
   a drive gear formed over the recess of the central portion and integral with the cylindrical core, the drive gear extending along the first and second radially extending side walls of cylindrical recess and protruding radially outwardly, the first flanking portion including a plurality of circumferentially spaced apart drive teeth, the second flanking portion including a plurality of circumferentially spaced apart drive teeth.

16. The feed roll of claim 15 wherein the drive gear of the feed roll is an annular drive gear comprising a worm gear.

17. The feed roll of claim 15 wherein the recess of the central portion of the cylindrical core is an annular recess and includes a plurality of circumferentially spaced indentations protruding radially inwardly into the base of the recess and further wherein an inner surface of the drive gear includes a plurality circumferentially spaced protruding projections, each of the plurality of circumferentially spaced protruding projections being received in a respective one of the plurality of circumferentially spaced indentations protruding radially inwardly into the base of the recess.

18. The feed roll of claim 15 wherein the drive gear is an annular drive gear and the drive gear protrudes radially outwardly with respect to an interior region of the first flanking portion adjacent the first radially extending wall and protrudes radially outwardly with respect to an interior region of the second flanking portion adjacent the second radially extending wall.

19. The feed roll of claim 15 wherein the drive gear of the feed roll protrudes radially outwardly with respect to an interior region of the first flanking portion adjacent the first radially extending wall and protrudes radially outwardly with respect to an interior region of the second flanking portion adjacent the second radially extending wall.

20. The feed roll of claim 15 wherein the first flanking portion of the outer surface of the cylindrical core includes a first plurality of annular sets of drive teeth, each of the first plurality of annular sets of drive teeth including a plurality of drive teeth and the second flanking portion includes a second plurality of annular sets of drive teeth, each of the second plurality of annular sets of drive teeth including a plurality of drive teeth.

* * * * *